US012132275B2

(12) United States Patent
Dobler

(10) Patent No.: US 12,132,275 B2
(45) Date of Patent: Oct. 29, 2024

(54) ELECTRICAL PLUG CONNECTOR

(71) Applicant: Neutrik AG, Schaan (LI)

(72) Inventor: Oliver Dobler, Tschagguns (AT)

(73) Assignee: Neutrik AG, Schaan (LI)

( * ) Notice: Subject to any disclaimer, the term of this patent is extended or adjusted under 35 U.S.C. 154(b) by 359 days.

(21) Appl. No.: 17/642,465

(22) PCT Filed: Sep. 22, 2020

(86) PCT No.: PCT/EP2020/025428

§ 371 (c)(1),
(2) Date: Mar. 11, 2022

(87) PCT Pub. No.: WO2021/058131

PCT Pub. Date: Apr. 1, 2021

(65) Prior Publication Data

US 2022/0311175 A1 Sep. 29, 2022

(30) Foreign Application Priority Data

Sep. 24, 2019 (AT) .............................. A 50816/2019
Jul. 14, 2020 (AT) .............................. A 50609/2020

(51) Int. Cl.
*H01R 13/73* (2006.01)
*H01R 13/52* (2006.01)
(Continued)

(52) U.S. Cl.
CPC ..... *H01R 13/5205* (2013.01); *H01R 13/5202* (2013.01); *H01R 13/748* (2013.01); *H01R 24/64* (2013.01)

(58) Field of Classification Search
CPC . H01R 13/5205; H01R 13/5202; H01R 13/46
See application file for complete search history.

(56) References Cited

U.S. PATENT DOCUMENTS 5,249,982 A * 10/1993 Funck .................. H01R 13/743
439/556
5,588,853 A 12/1996 Anthony
(Continued)

FOREIGN PATENT DOCUMENTS

CN 204516967 U 7/2015
CN 204615057 U 9/2015
(Continued)

OTHER PUBLICATIONS

International Search Report in PCT/EP2020/025426, mailed Feb. 2, 2021.

(Continued)

*Primary Examiner* — Neil Abrams
(74) *Attorney, Agent, or Firm* — Volpe Koenig

(57) ABSTRACT

An electrical plug connector, in particular a built-in plug connector, for mounting on the rear side of a device wall, control panel, or the like includes a housing with least one insertion opening for a complementary plug connector, preferably a cable plug, wherein a projecting connecting flange protrudes on the insertion-side end of the housing, which connecting flange has through holes for feeding through fasteners. A seal with a central cutout in the region of the insertion opening has passages for feeding through the fasteners. The insertion-side surface of the connecting flange as well as all insertion-side structures inside the boundary of the connecting flange are covered by the seal.

42 Claims, 21 Drawing Sheets

Figure 1:
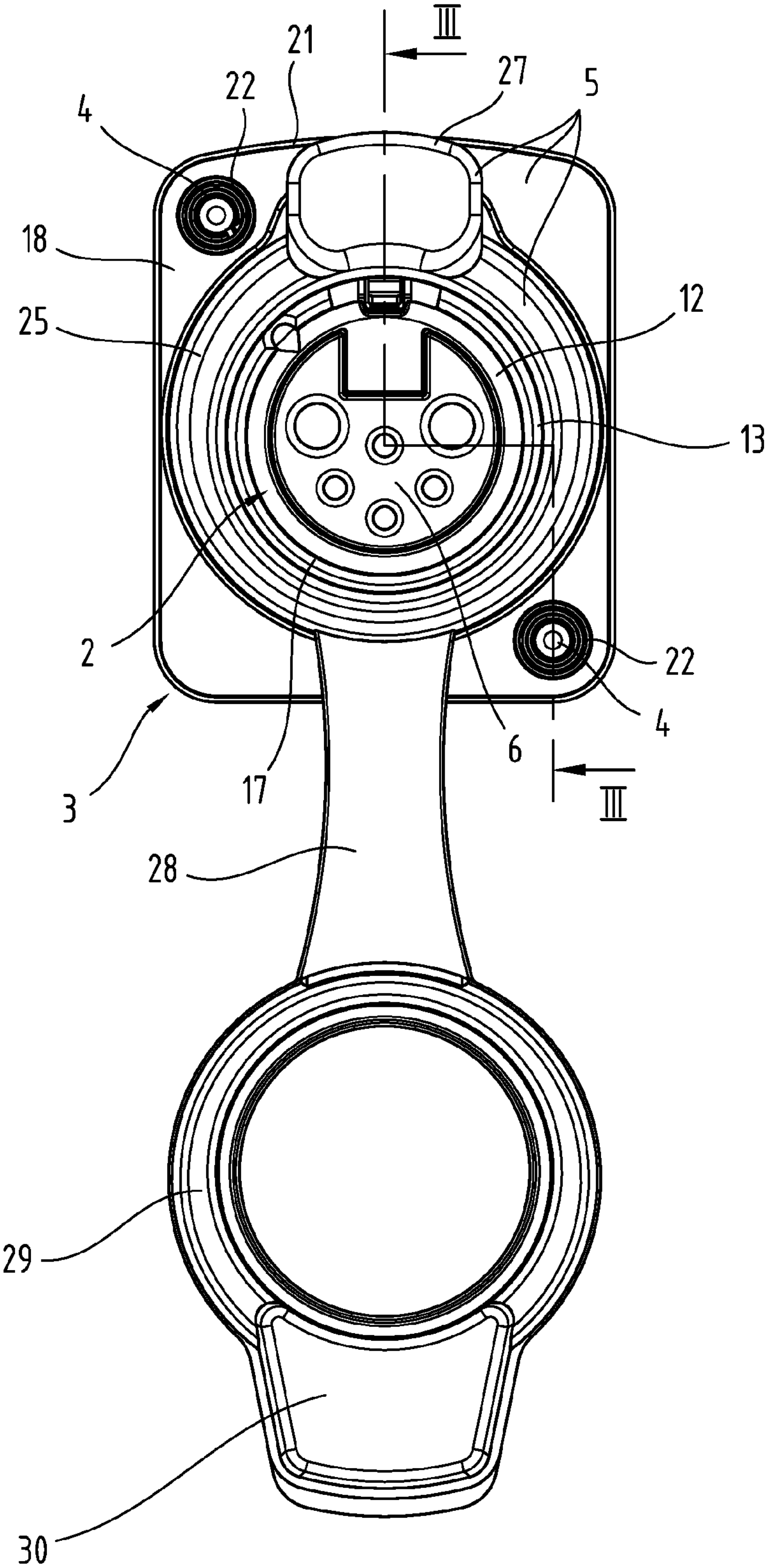

(51) Int. Cl.

| | |
|---|---|
| ***H01R 13/74*** | (2006.01) |
| *H01R 24/64* | (2011.01) |

(56) References Cited

U.S. PATENT DOCUMENTS

| | | | | |
|---|---|---|---|---|
| 5,947,766 | A | 9/1999 | Tsuji et al. | |
| 6,254,428 | B1 * | 7/2001 | Murakami | H01R 13/5219 439/588 |
| 7,914,306 | B1 * | 3/2011 | Blackwell | H01R 13/5213 439/588 |
| 8,602,810 | B2 | 12/2013 | Bruenger | |
| 9,666,975 | B1 | 5/2017 | Baldwin et al. | |
| 10,348,030 | B1 | 7/2019 | Lin et al. | |
| 11,165,188 | B2 * | 11/2021 | Carle | H01R 13/5205 |
| 2007/0141886 | A1 | 6/2007 | Hammer et al. | |
| 2012/0100753 | A1 * | 4/2012 | Omae | H01R 13/648 439/588 |
| 2012/0282793 | A1 | 11/2012 | Brune et al. | |
| 2015/0298624 | A1 | 10/2015 | Tyler | |
| 2017/0229804 | A1 * | 8/2017 | Kurita | B60L 53/16 |
| 2021/0394626 | A1 | 12/2021 | Genece et al. | |
| 2022/0376430 | A1 * | 11/2022 | Jutz | H01R 43/0207 |

FOREIGN PATENT DOCUMENTS

| | | | |
|---|---|---|---|
| CN | 209150362 | U | 7/2019 |
| DE | 9105135 | | 6/1991 |
| DE | 10 2008 047 145 | B3 | 4/2010 |
| JP | H1064630 | A | 3/1998 |
| JP | 2005327561 | | 11/2005 |
| JP | 2017195041 | | 10/2017 |
| KR | 20160104928 | | 9/2016 |
| WO | 2018/220033 | A1 | 12/2018 |

OTHER PUBLICATIONS

International Search Report in PCT/EP2020/025428, mailed Jan. 13, 2021.

Austrian Office Action in A 50609/2020, dated Jan. 31, 2022, with English translation of relevant parts.

* cited by examiner

ELECTRICAL PLUG CONNECTOR

CROSS REFERENCE TO RELATED APPLICATIONS

This application is the National Stage of PCT/EP2020/025428 filed on Sep. 22, 2020, which claims priority under 35 U.S.C. § 119 of Austrian Application Nos. A 50816/2019 filed on Sep. 24, 2019 and A 50609/2020 filed on Jul. 14, 2020, the disclosures of which are incorporated by reference. The international application under PCT article 21(2) was not published in English.

The invention relates to an electrical plug connector, in particular a built-in plug connector, for mounting on the rear side of a device wall, control panel, or the like, according to the preamble of claim 1, as well as a seal for such a plug connector, according to the preamble of claim 15. However, the invention also relates to an electrical plug connector, in particular a built-in plug connector, according to the preamble of claim 25, as well as a seal for such a plug connector, according to the preamble of claim 34.

Built-in plug connectors, also referred to as chassis sockets, are installed in the housings of electrical devices, in control panels, or similar arrangements, in order to connect these devices to electric lines. These lines carry, on at least one end, a cable plug connector in a design complementary to the built-in plug connector and can be electrically connected thereto and also be locked mechanically against undesired release of the connection.

The built-in plug connector typically comprises a housing with an insertion opening for the complementary plug connector, wherein a projecting connecting flange protrudes on the insertion-side end of the housing, which connecting flange has recesses for feeding through fastening means.

Typically, such chassis sockets are designed for front mounting, in which case the housing with the plug contacts is positioned, from the inside, in the passage opening of a housing wall or control panel. On the opposite side of the housing wall or the like, a front plate is provided, through which fastening screws are fed, which also penetrate the housing wall or the like and engage with fastening sections of the housing or fix the same via separate clamping means on the housing wall. These fastening sections are preferably arranged in flat, plane connecting flanges, which laterally protrude from the housing and are situated parallel to the housing wall, control panel, or the like.

For protection against the intrusion of dust and/or moisture into the inside of the device or the control panel, additionally, seals are used, as well.

CN 204516967 U discloses a built-in plug connector, in which an essentially flat sealing plate is inserted between the flange plate and the connecting flange on the housing and seals the connection off these two components. If a sealing of the entire built-in plug connector against a device wall, in which it is inserted, a control panel, or the like is desired, an additional seal must be provided between the built-in plug connector and the device wall. This makes the installation more complex and slower and requires an additional component.

A seal for sealing the of at least the flange plate of a built-in plug connector is known and is used, for example, in the SE8FD-TOP installation kit by the company Neutrik AG. This seal is designed as an essentially flat sealing plate and has a central cutout at the location of the insertion opening of the built-in plug connector. By means of the positioning between the device wall, control panel, or the like and the flange plate with the insertion opening for the complementary plug connector, an intrusion of dust, moisture, etc. into the interior of the device or the control panel is prevented.

The object of the present invention was to overcome the shortcomings of the prior art and to create a built-in plug connector as comprehensively sealed as possible, which can be mounted by the end user without additional components, in a simple and swift manner with common tools, preferably entirely from the rear side, i.e. the side of the housing wall, control panel, or the like, opposite the insertion side for the complementary plug connector.

This object is achieved by means of a plug connector as well as an associated seal according to the claims.

For this purpose, the built-in plug connector according to the invention is characterized in that a depression is formed in the insertion-side surface of the connecting flange, into which depression the seal is inserted, wherein the seal covers all insertion-side structures situated within the depression. By means of this structure, the completely pre-assembled plug connector can be positioned and fastened on the inside of the housing wall in a simple manner, from the inside of the housing. The sealing plate is arranged between this chassis socket and the inside of the housing wall and thus prevents the intrusion of dust or moisture through the cutout in the housing wall, through which the complementary plug connector is inserted.

In this regard, it is preferably provided that the depression for the seal is bounded by a web on the connecting flange extending along the outer circumferential edge of the depression. Thus, an inadvertent slipping of the seal is prevented, which seal is thus already held in position optimally upon installation.

A further embodiment according to the invention is characterized in that a sealing housing is slid from the rear side over the housing and the connecting flange, wherein the connecting flange is encompassed by an insertion-side front circumferential edge, which reaches forward to the front side of the connecting flange including the seal. Thus, already existing housings for mounting on the rear side of the housing, the control panel, or the like may also be supplemented in a dust-tight and moisture-tight manner.

A further optional embodiment provides that the seal fills up the depression essentially completely, and the web has a height which is slightly smaller than the thickness of the seal along its circumferential edge. Thus, on the one hand, an optimal sealing effect is ensured, as, when screwing the plug connector to the housing wall, the seal is pressed onto said wall and is somewhat compressed, in order to fill up the volume between the connecting flange and the housing wall as well as possible and optimally compressed. On the other hand, however, the web limits the compression of the seal, so that, even when the connection means are completely tightened, a damage to the seal is not to be expected.

A further optional embodiment of the invention is characterized in that the inner side of the web is slanted outwardly, and the outside of the seal is slanted in a complementary manner thereto. This results in that the best possible sealing effect is achieved especially in the edge region of the seal, as the seal can give way outwardly when compressed in the edge region and can thus optimally seal this region.

A particularly advantageous embodiment of the invention further provides that the depression also contains the recesses for feeding through the fastening means. This embodiment ensures that a passage of dust and/or moisture can securely be prevented even in the region of the mounting bores in the housing wall or control panel.

In this variant of the plug connector, it is particularly preferred if optionally, sealing grommets surrounding the passages for feeding through fastening means are integrally formed onto the seal on the insertion side, which sealing grommets, in the installed state of the plug connector, are situated inside the fastening bores of a device wall, control panel, or the like. With this arrangement, the sealing effect in the region of the mounting bores can be improved even further.

In this regard, the outer diameter of the sealing grommets preferably corresponds to the inner diameter of the fastening bores.

In this regard, it is also preferred if the inner diameter of the sealing grommets corresponds to the outer diameter of the fastening means.

A further optional embodiment of a plug connector according to the invention is characterized in that the insertion opening is bounded, at least over a part of its circumference, by a circular web rising on the insertion side above the base of the recess for the seal, wherein the seal has a through hole for the web. In addition to the best possible sealing, this also allows correct guiding of the complementary plug connector into the insertion opening.

The web preferably extends over more than 80% of the circumference of the insertion opening.

The optimal sealing between the inner circumference of the insertion opening and the outer surface of the complementary plug connector is provided if preferably, the seal has a rim raised on the insertion side for accommodating the web, which rim, in the assembled state of the plug connector, is located within the mounting bore of a device wall, control panel, or the like.

A further advantageous embodiment of a plug connector according to the present invention is characterized in that a through hole extends radially outwardly in the connecting flange starting from the insertion opening, through which through hole, in the assembled and installed state, an actuating element for a locking mechanism for the complementary plug connector protrudes from the housing outwardly through the device wall, connecting flange, or the like. In this regard, this actuating element is advantageously covered by means of a dome integrally formed onto the seal, also protruding outwardly through the device wall, control panel, or the like. Thus ensures that the optimal sealing effect against dust and moisture is given even in the region of this actuating element.

Preferably, the dome is a section of the rim.

In order to prevent an intrusion of dust and moisture into the inside of the device or the control panel also when the complementary plug connector is not plugged in, at least one radially protruding connecting strip is integrally formed onto the seal according to a preferred embodiment, on the outer end of which connecting strip, a sealing plug is fastened, the outer diameter of which is slightly greater than the inner diameter of the sealing lip of the central cutout. Thus, the insertion opening can be closed in a dust-tight and moisture-tight manner even without the complementary plug connector being plugged in.

Preferably, the sealing plug has a pot-shaped design, in order to achieve the optimal closing effect at a low weight and low material requirement.

The achievement of the initially stated object of mounting a built-in plug connector in a dust-tight and moisture-tight manner on the inside of a device wall or control panel is also ensured by a seal for a plug connector described in the preceding paragraphs, which seal is designed, according to the invention, for the insertion into a depression of the insertion-side surface of a connecting flange of the plug connector.

In order to achieve the optimal sealing effect even in the region of the fastening bores, according to a preferred embodiment of the invention, passages for feeding through fastening means are formed in the seal and sealing grommets surrounding said passages are integrally formed onto the seal on the insertion side, which sealing grommets are situated inside the fastening bores of a device wall, control panel, or the like when the plug connector is installed.

In this regard, the outer diameter of the sealing grommets preferably corresponds to the inner diameter of the fastening bores.

Alternatively or also additionally thereto, it may be provided that the inner diameter of the sealing grommets corresponds to the outer diameter of the fastening means.

A further preferred embodiment of the seal according to the invention is characterized in that the seal has a rim raised on the insertion side, which rim is located within the mounting bore of a device wall, control panel, or the like when the plug connector is installed. Thus, an optimal sealing in the region of the mounting bore is ensured when the complementary plug connector is introduced into the insertion opening.

In order to securely seal possible actuating elements, in particular for unlocking a lock of the plugged-in complementary plug connector, it is preferably provided that a dome is integrally formed onto the seal, which dome, in the installed state, protrudes outwardly through the device wall, control panel, or the like.

Preferably, the seal is designed with a simple structure and optimal sealing effect such that the dome is a section of the rim.

Preferably, a further embodiment of the seal according to the invention for sealing in a dust-tight and moisture-tight manner even without a complementary plug connector is characterized in that at least one radially protruding connecting strip is integrally formed onto the seal, to the outer end of which connecting strip a sealing plug is fastened that is preferably pot-shaped for reasons of weight and material savings, the outer diameter of which sealing plug is slightly greater than the inner diameter of the sealing lip of the central cutout. In order to improve the sealing effect even further, just like handling, in this variant, a full-surface gripping lug may optionally protrude on the side of the sealing plug opposite the connecting strip, which gripping lug is preferably designed to be pot-shaped, and thus is configured for covering and protecting the dome.

According to a further variant, the device according to the invention is characterized in that the outer edge of the flange plate is bent up towards the housing and overlaps the outer edge of the connecting flange, wherein the seal has a circumferential sealing lip, which protrudes radially into the insertion opening, and the seal has an edge bent up towards the housing, which overlaps the outer circumferential edge of the connecting flange and which itself is overlapped by the outer edge of the flange plate, wherein, in the assembled state, the circumferential edge of the flange plate extends at maximum to the height of the rear side of the flange plate of the housing, and the edge of the seal protruding towards the housing is higher than the rear surface of the connecting flange over the entire circumference of said connecting flange. By pressing the built-in plug connector onto the housing wall, the control panel, or the like until the edge of the flange plate abuts on said wall, the edge of the seal that is higher than the connecting flange in the rear is pressed tightly onto the wall and is squeezed so as to fill the volume between the connecting flange and the edge of the flange plate. Here, the seal is located between the connecting flange and the flange plate so as to be protected against damage before, during, and after installation. The insertion opening is sealed by the circumferential sealing lip when the complementary plug is plugged in, while the sealing against the housing of the device or the control panel is ensured by the bent-up edge of the seal protected by the flange plate. The components flange plate, seal, and housing with connecting flange may be plugged together at the factory and may be used by the end user as a component that can be handled as one joint part.

Preferably, the inner side of the outer edge, which is bent up towards the housing, of the flange plate is slanted outwardly, and the outer side of the circumferential edge of the seal is also slanted outwardly, preferably in a complementary manner thereto. When plugging together and/or when fastening to the device wall or the control panel by means of the provided fastening means, the edge of the seal is slightly squeezed thereby and is pressed towards the device wall or the surface of control panel, which allows achieving a particularly good sealing effect.

An alternative embodiment of a plug connector according to the invention provides that, in the assembled state, the circumferential edge of the flange plate ends before the height of the rear side of the flange plate of the housing, and a circumferential sealing edge projecting outwards covers at least a part of the thickness of the edge, which is bent up towards the housing, of the flange plate. Thereby, the shearing effect of a slanted inner side of the flange plate is avoided, and the sealing effect is effected by a force acting perpendicularly onto the edge of the seal.

According to a particularly advantageous embodiment of the invention, it is provided that at the locations of the mounting bores, sealing grommets are integrally formed onto the seal, which protrude upwards towards the flange plate. In the assembled state, the sealing grommets extend inside the mounting bores of the flange plate, which preferably have socket-shaped extensions in the direction towards the connecting flange of the housing. In this regard, their outer diameter preferably corresponds to the inner diameter of the mounting bores and/or of the socket-shaped extensions, wherein the sealing grommets end in the mounting bore above the lower edge of the accommodating region for the head of the fastening means. Thereby, on the one hand, a further improvement of the sealing effect can be achieved in that the intrusion of moisture, dirt, or dust via the mounting bores is prevented, while the fastening means, in particular the screw heads, still exhibit a hard stop on the flange plate, which can be noticed well.

A further optimization of the sealing effect is given if the inner diameter of the sealing grommets corresponds at a minimum to the outer diameter of the fastening means and thus, all surfaces abut one another in a sealing manner.

According to a preferred embodiment of the invention, the plug connector is additionally characterized in that the flange plate has retaining pins protruding towards the housing, and the connecting flange has corresponding retaining bores, into which the ends of the retaining pins can be inserted. Preferably, the retaining bores are bounded by rings rising above the connecting flange, and the seal overlaps said rings with centrally open domes abutting thereon. Thereby, the flange plate and the housing are connected to the seal inserted in between them sufficiently well for preventing them from falling apart and to be able to handle the plug connector as a joint component. Moreover, in the case of retaining bores, which completely penetrate the connecting flange, the retaining pins may be provided for butting on the front side of the device housing, the connecting flange, or the like and thus, have a spacer effect, in order to limit the influence on the seal and thus prevent damage to it.

In order to ensure the sealing effect for the retaining bores, as well, preferably, the central opening of the domes has a slightly smaller diameter than the passage opening and/or the outer diameter of the retaining pins. Thus, a sealed feed-through of the retaining pins is ensured, as well as a good cohesion due to the friction between the seal and the retaining pin.

Preferably, the plug connector is designed such that the flange plate has a circumferential groove surrounding the insertion opening, in which groove a ridge is accommodated, which surrounds the sealing lip for the insertion opening radially outside and rises above the surface of the seal. In addition to the optimal centering of the seal and the flange plate relative to one another, this ridge also acts as an additional sealing ridge and thus increases the sealing effect.

In many cases of plug connections, it is desired that an inadvertent release of the connection is prevented. For this purpose, locking arrangements are present between the complementary plug connectors, which locking arrangements, however, have to be unlocked by actuating an actuating element to effect the desired release of the plug connection. Therefore, a preferred embodiment of a plug connector according to the invention provides that in the flange plate, a through hole extends radially outwards from the insertion opening, through which through hole, in the assembled state, an actuating element for a locking mechanism protrudes from the housing outwards towards the front side of the flange plate. In order to also seal this extension of the insertion opening in an optimal manner, a dome rising above the surface of the seal, radially connecting to the insertion opening extends through the through hole outwards towards the front side of the flange plate. In this regard, the actuating element is covered by the dome.

For achieving the initially mentioned object, particularly a seal for an electrical plug connector, in particular a built-in plug connector, especially a plug connector according to one of the preceding paragraphs, has been devised for sealing it optimally against a device wall, control panel, or the like. This seal has a central cutout at the location of the insertion opening of the plug connector and recesses at the locations of the mounting bores for the plug connector.

According to the invention, it is particularly characterized in that a sealing lip surrounding the central cutout limits the inner circumference of the central cutout, and an edge bent backwards and rising above the rear surface of the sealing lip is present on a rear side of the seal, on which edge a circumferential sealing structure is arranged. Thus, this seal is suitable to both seal the insertion opening when the complementary plug connector is plugged in, and to simultaneously seal the built-in plug connector against the device housing, the wall, the control panel, or the like.

In this regard, the sealing structure preferably comprises a circumferential sealing ridge, which enables a secure, linear sealing. In this regard, the outside of the circumferential edge of the seal is preferably slanted outwardly, so as to transform only a part of the fastening force acting perpendicularly onto the seal into contact pressure and to thereby limit the same.

As an alternative embodiment, a seal is provided, in which the sealing structure is a circumferential sealing edge radially projecting outwards. Thereby, an undesired shearing effect to the outer edge of the seal can be prevented, and the sealing edge can be pressed perpendicularly on the device wall, control panel, or the like.

A particularly preferred embodiment for a seal for built-in plug connectors, in particular, is characterized in that sealing grommets rising above the front surface of the seal and having central feed-throughs for the fastening means are arranged at locations for feeding through fastening means. Thereby, the built-in plug connector can be mounted so as to be optimally sealed even at the locations of the fastening means.

A further advantageous embodiment of a seal according to the invention is characterized in that domes rising above the front surface of the seal and having central feed-throughs for the spacer pins are arranged at locations for feeding through retaining pins. Such a seal is optimally suited for use in built-in plug connectors, whose flange plate and housing can be connected at least provisionally by means of cooperating retaining pins and retaining bores in these components.

For built-in plug connectors with locking arrangements and actuating elements for unlocking them, a seal, which according to the invention has a dome rising above the front surface of the seal radially connecting to the insertion opening, is optimally suited. Under said dome, the actuating element of the locking arrangement can be accommodated. In this regard, this dome is preferably formed in one piece with the seal.

The good centering of the seal against preferably the flange plate is ensured by means of a ridge rising above the front surface of the seal and surrounding the sealing lip for the insertion opening radially outside. This ridge is also an additional sealing edge and additionally improves the sealing effect.

In order to keep the built-in plug connector sealed even if the complementary plug connector is not plugged in, preferably, at least one radially protruding connecting strip is integrally formed onto the seal, to the outer end of which a sealing plug is fastened, the outer diameter of which is slightly greater than the inner diameter of the sealing lip of the insertion opening.

For the sake of material savings, this sealing plug is preferably designed so as to be recessed in the shape of a pot.

Preferably, a full-surface gripping lug protrudes on the side of the sealing plug opposite the connecting strip, which significantly facilitates handling. Preferably, this gripping lug is also designed to be pot-shaped and overlaps and protects the dome in the plugged-in state of the sealing plug, which dome covers and seals the actuating element of the locking arrangement.

For the purpose of better understanding of the invention, it will be elucidated in more detail by means of the figures below.

Figure 2:
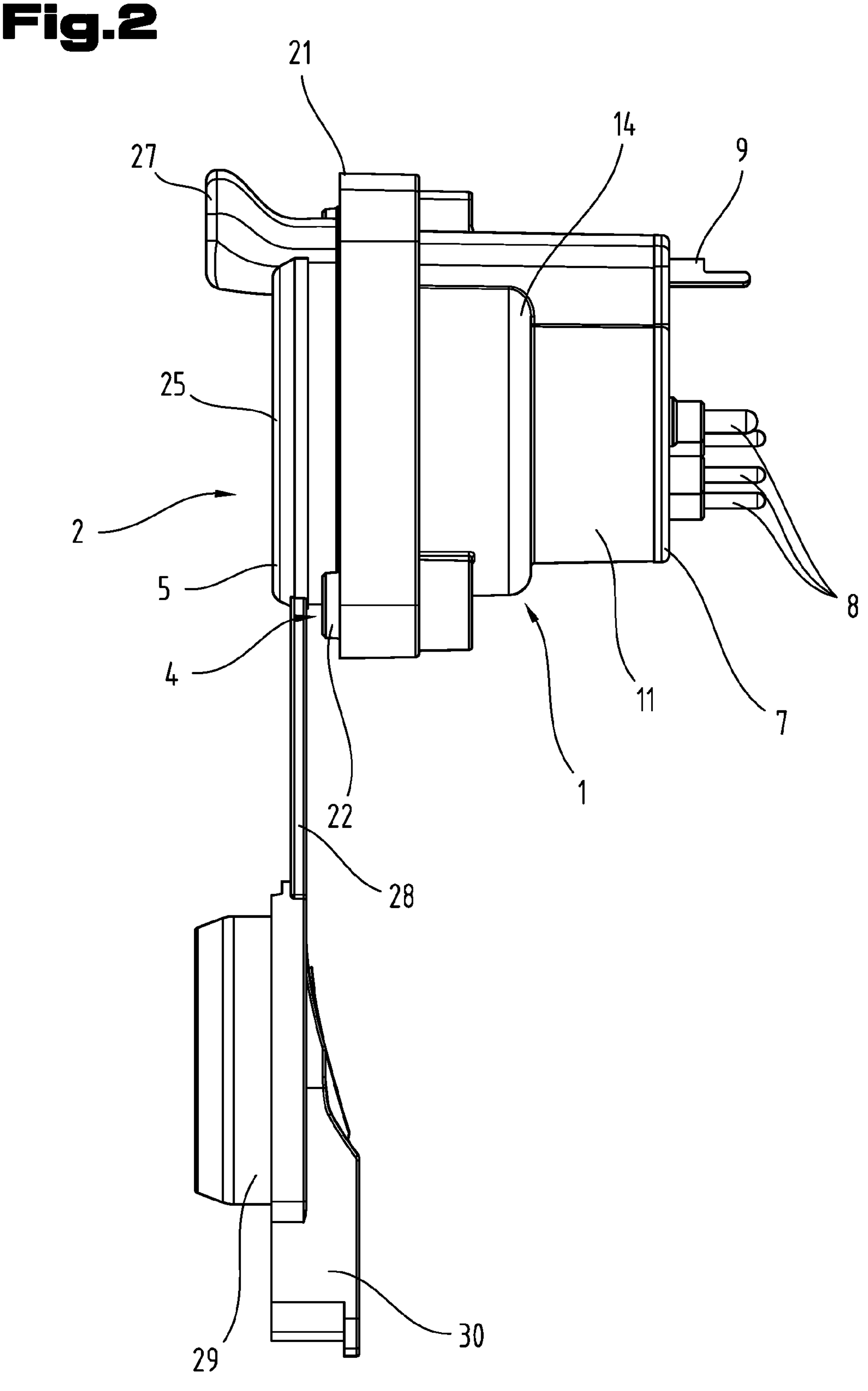
Figure 3:
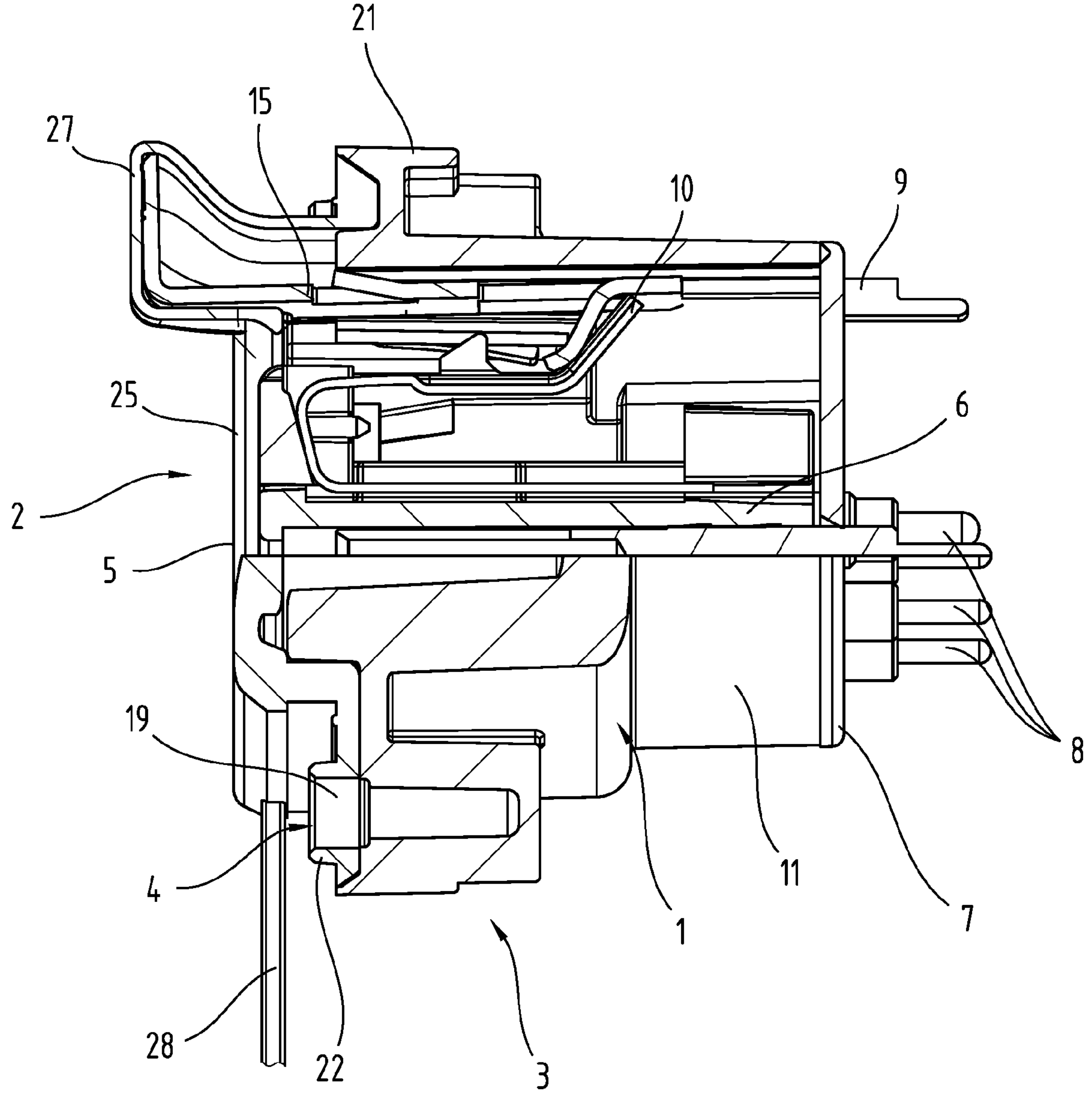
Figure 4:
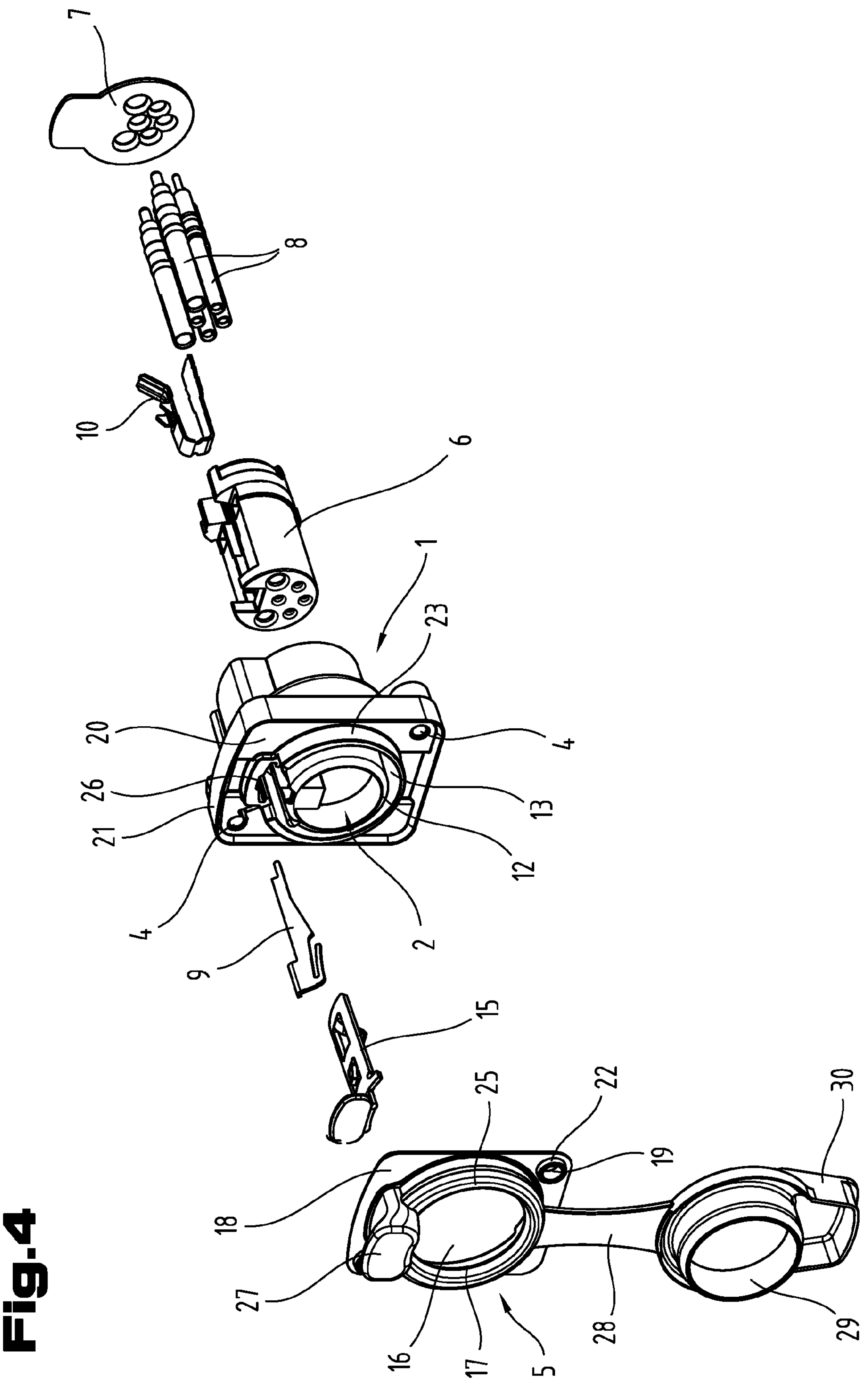
Figure 5:
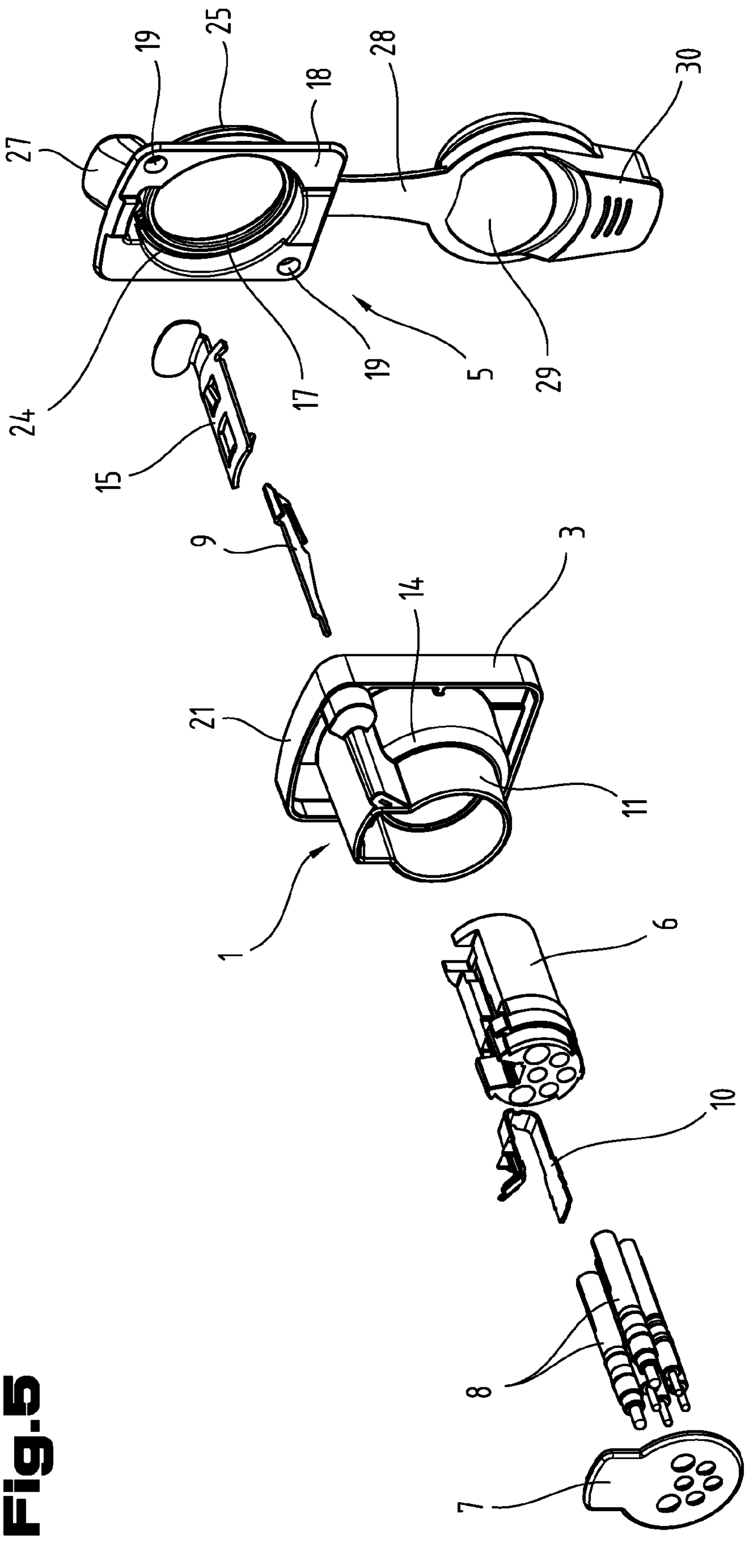
Figure 6:
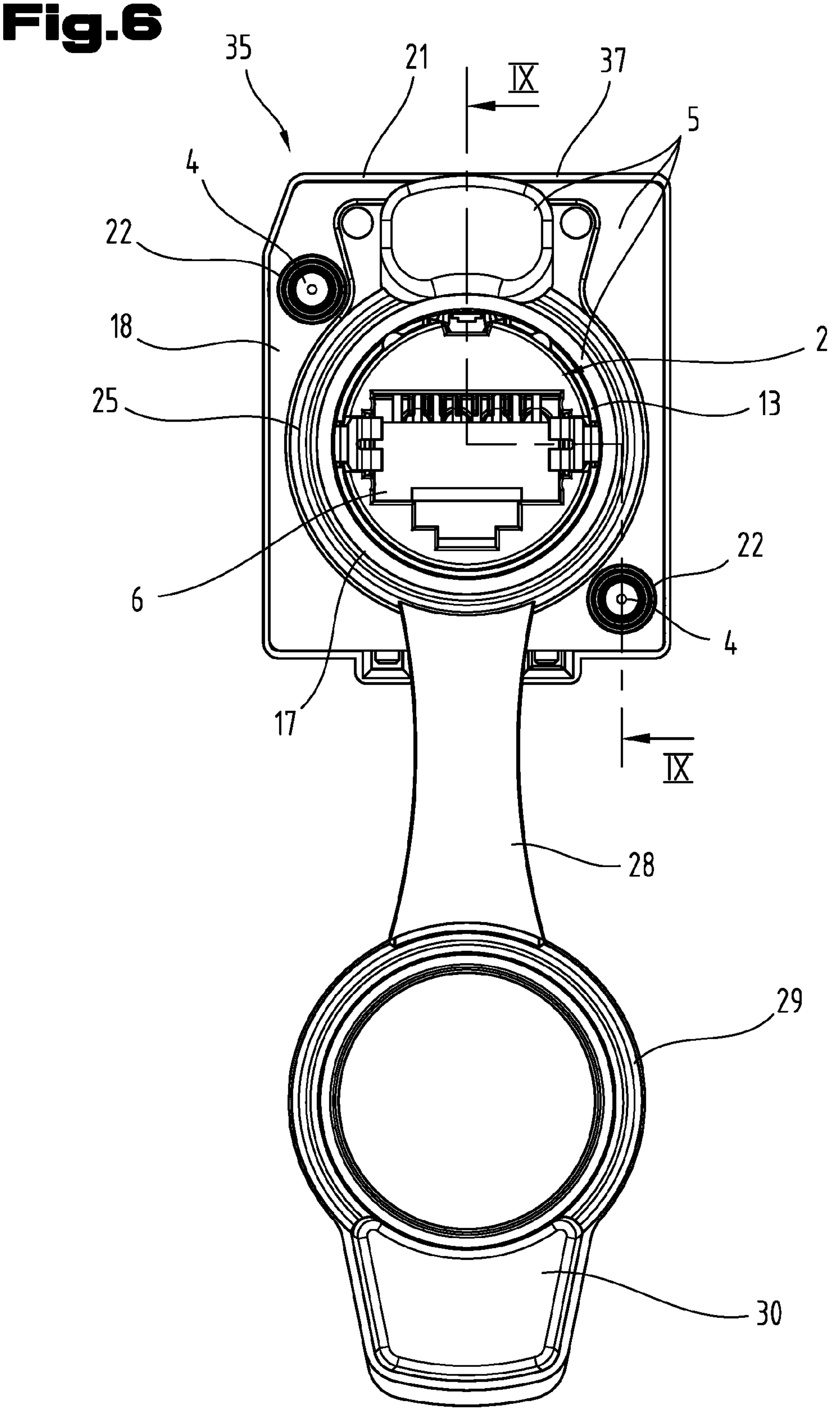
Figure 7:
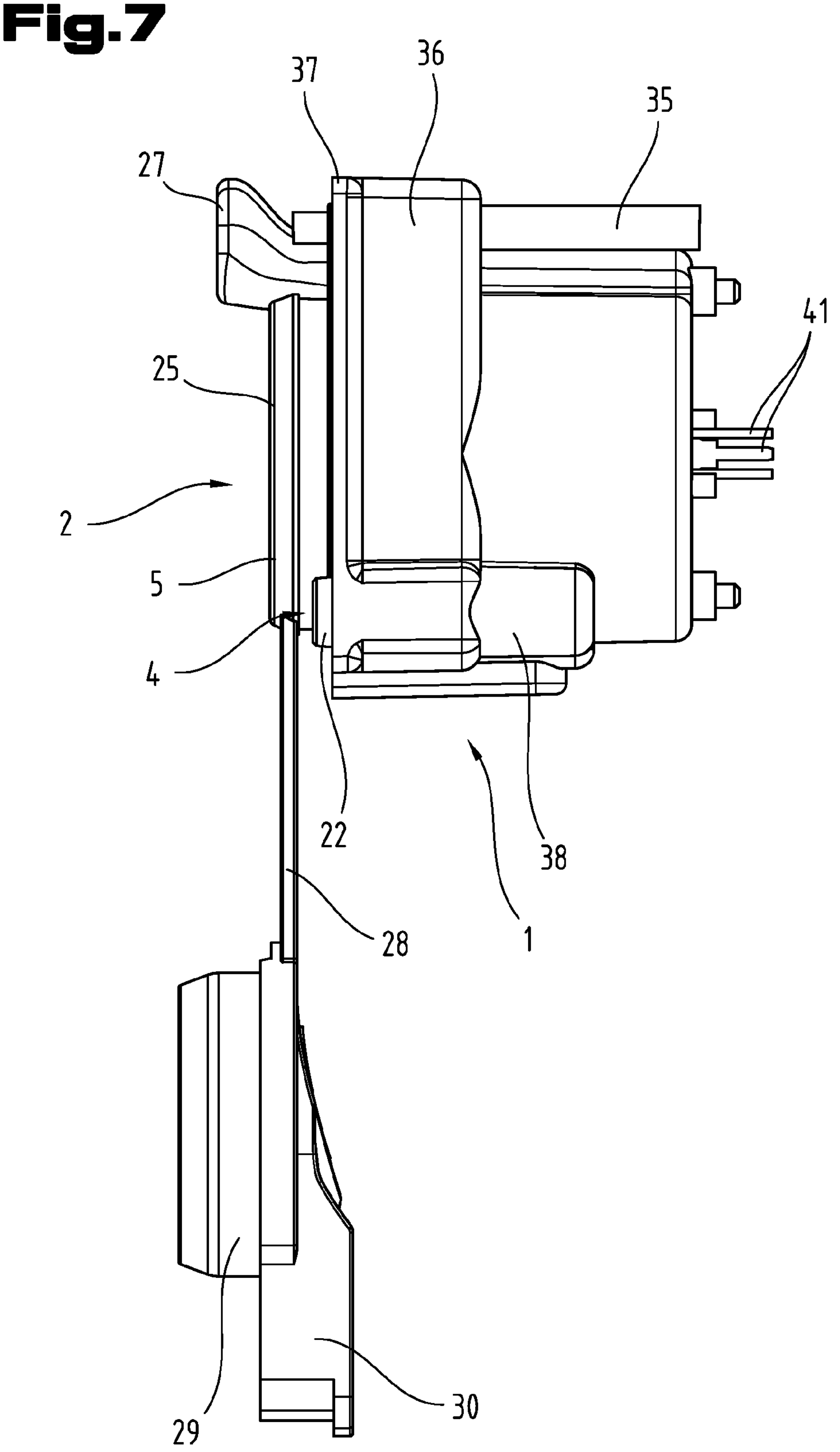
Figure 8:
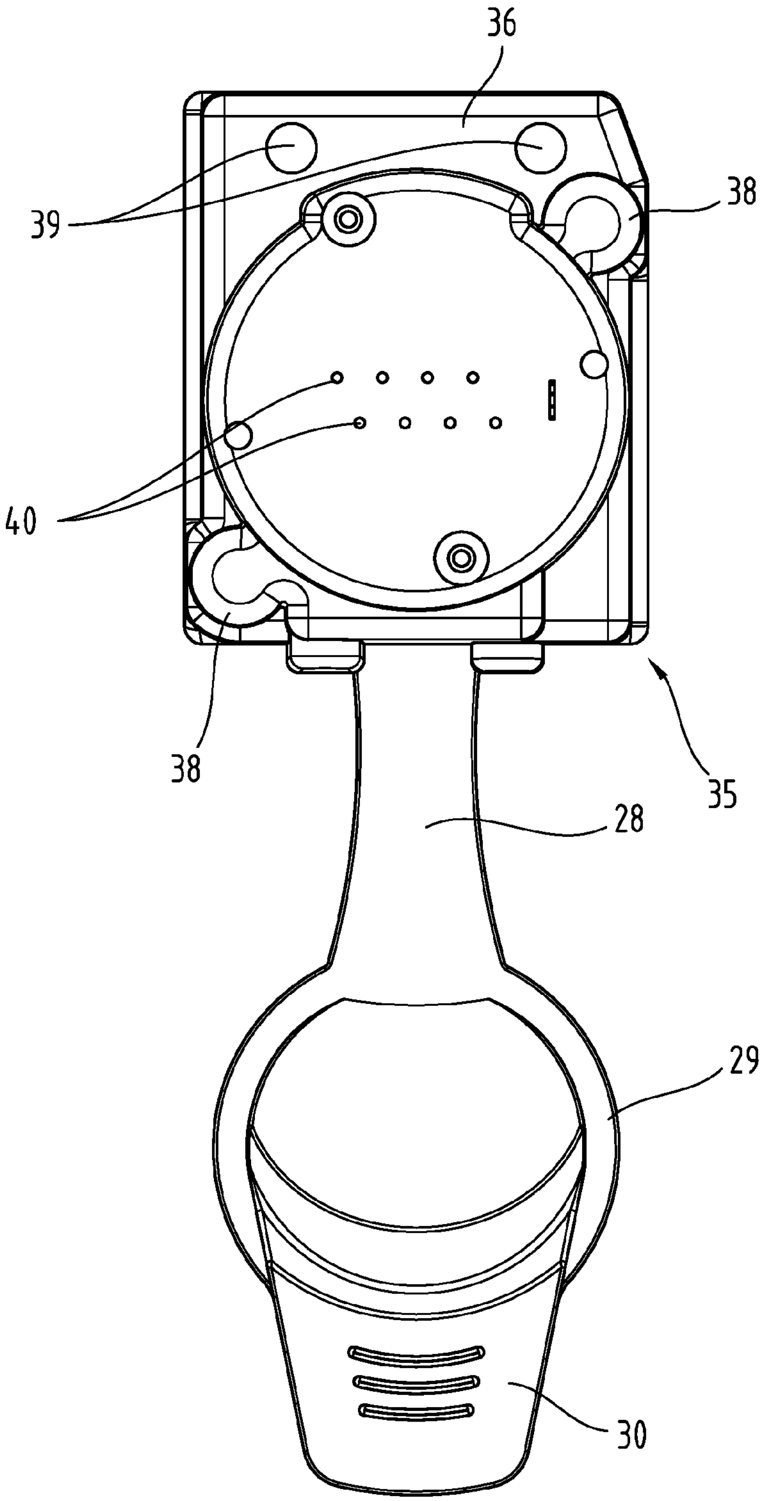
Figure 9:
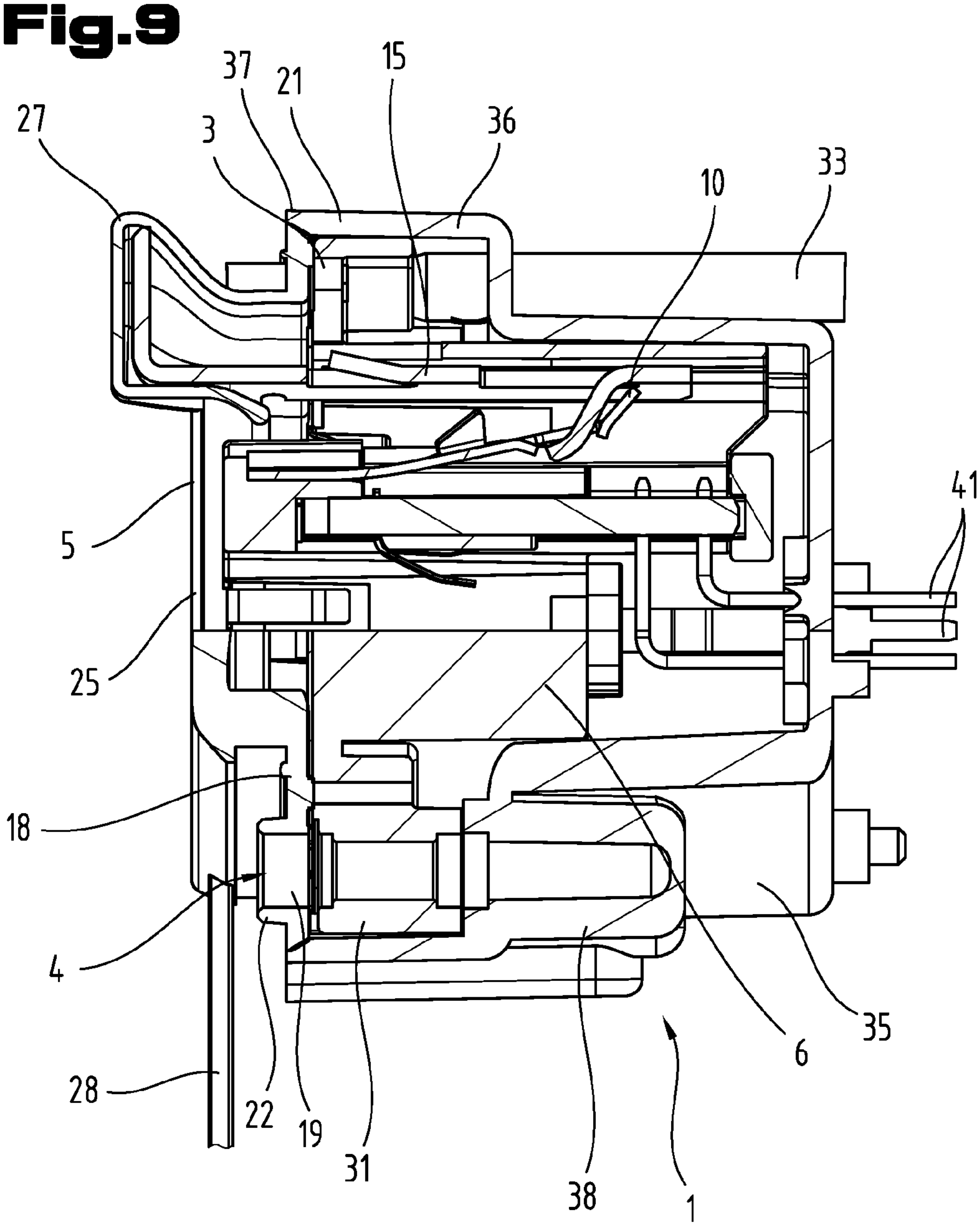
Figure 10:
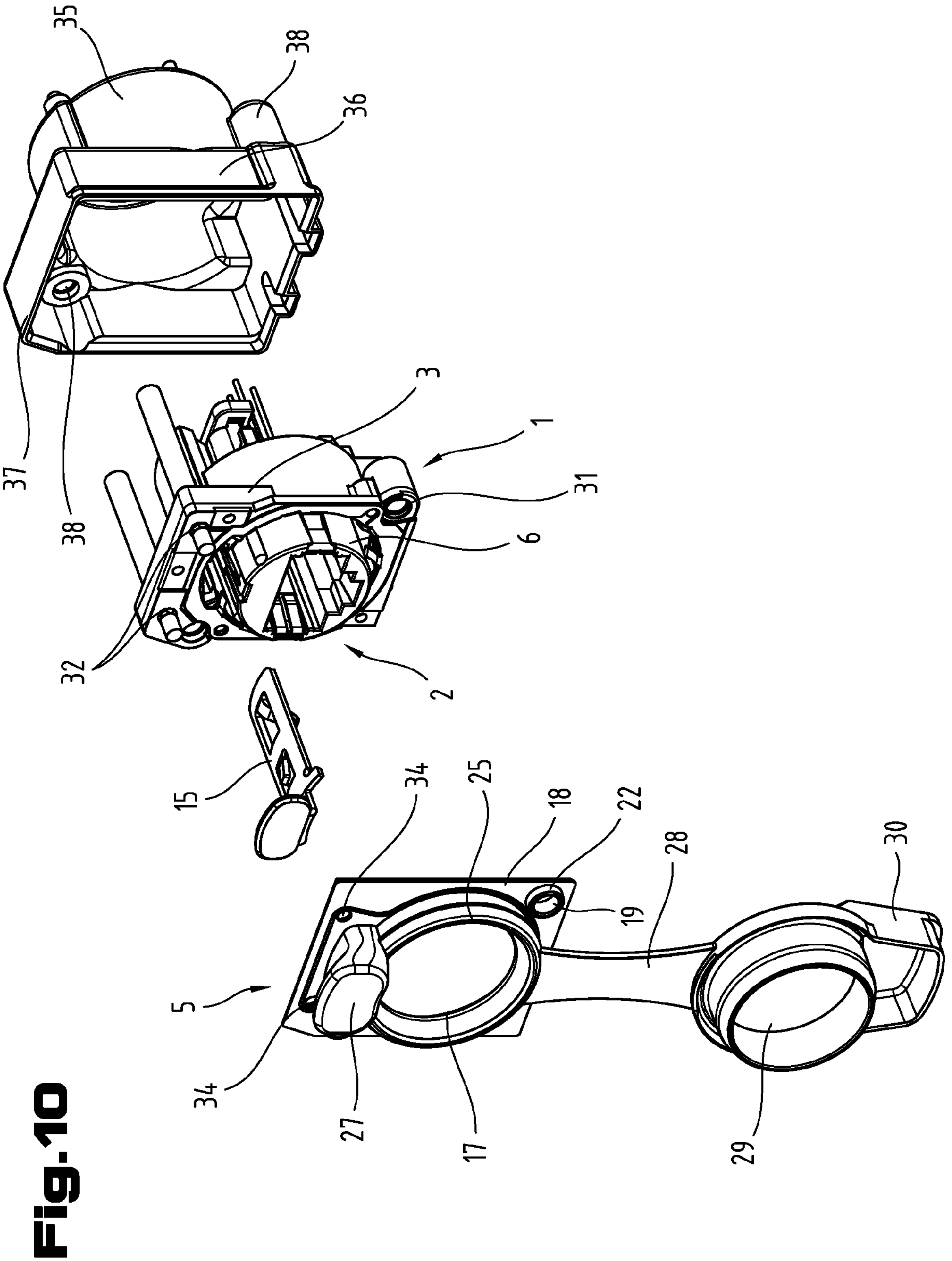
Figure 11:
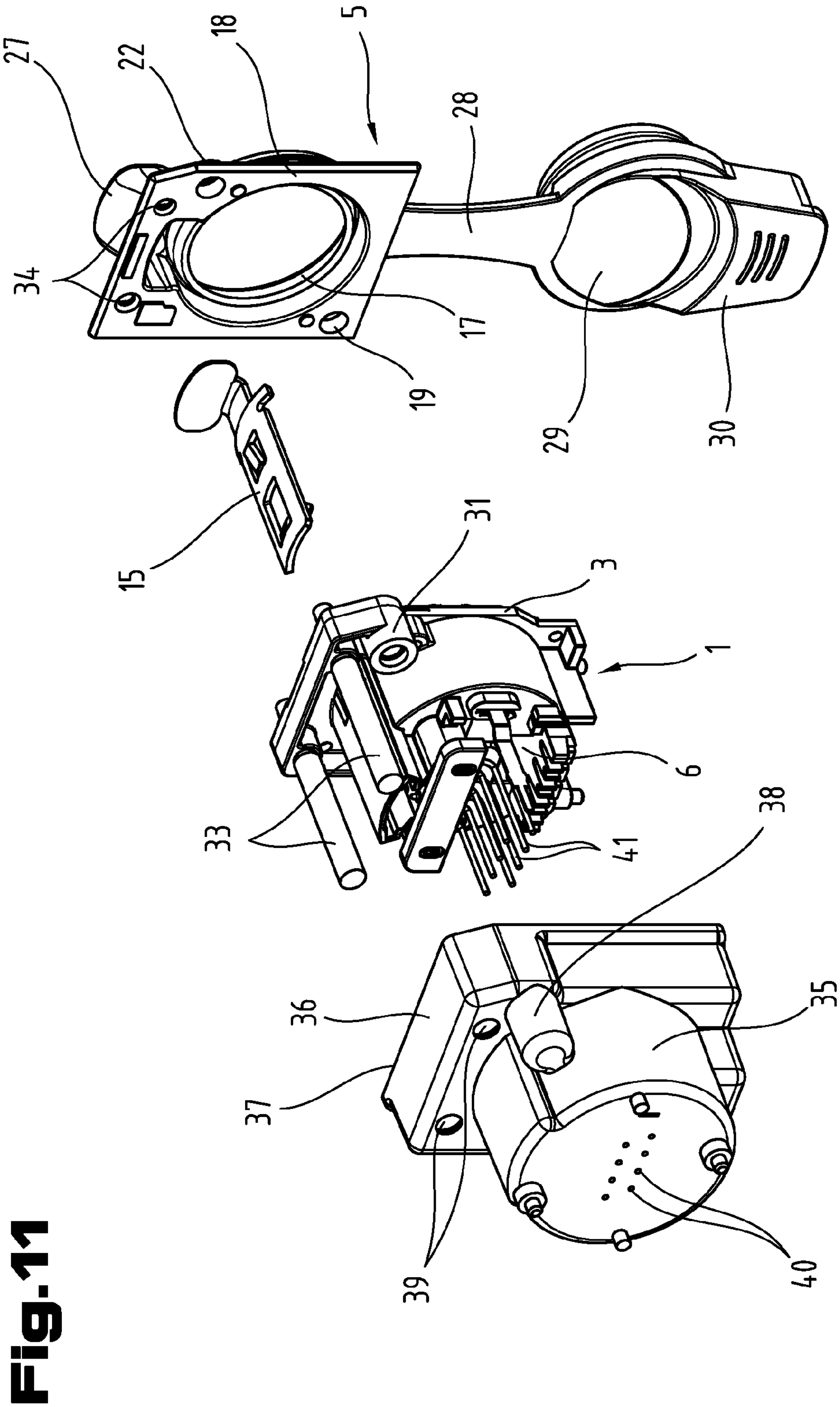
Figure 12:
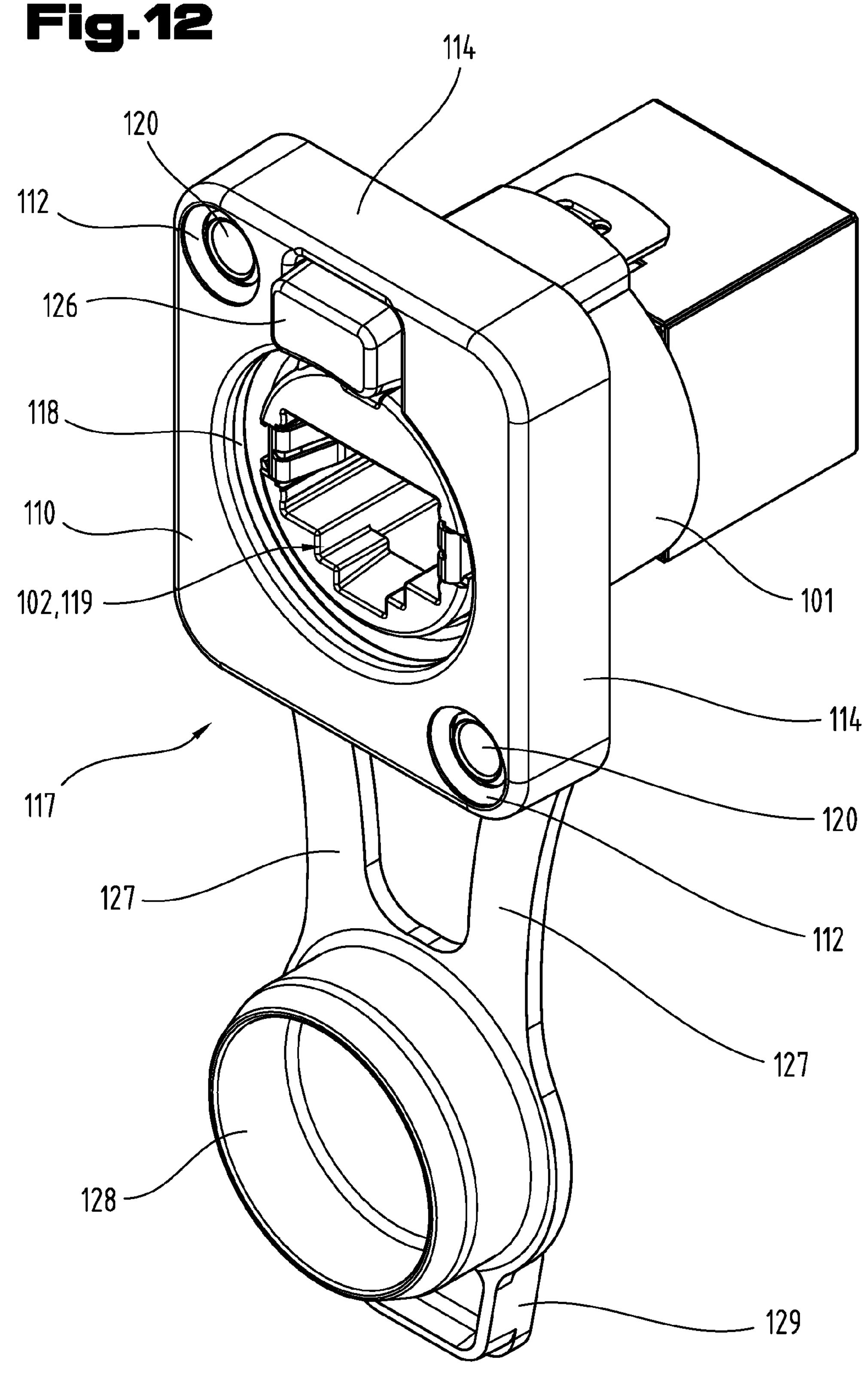
Figure 13:
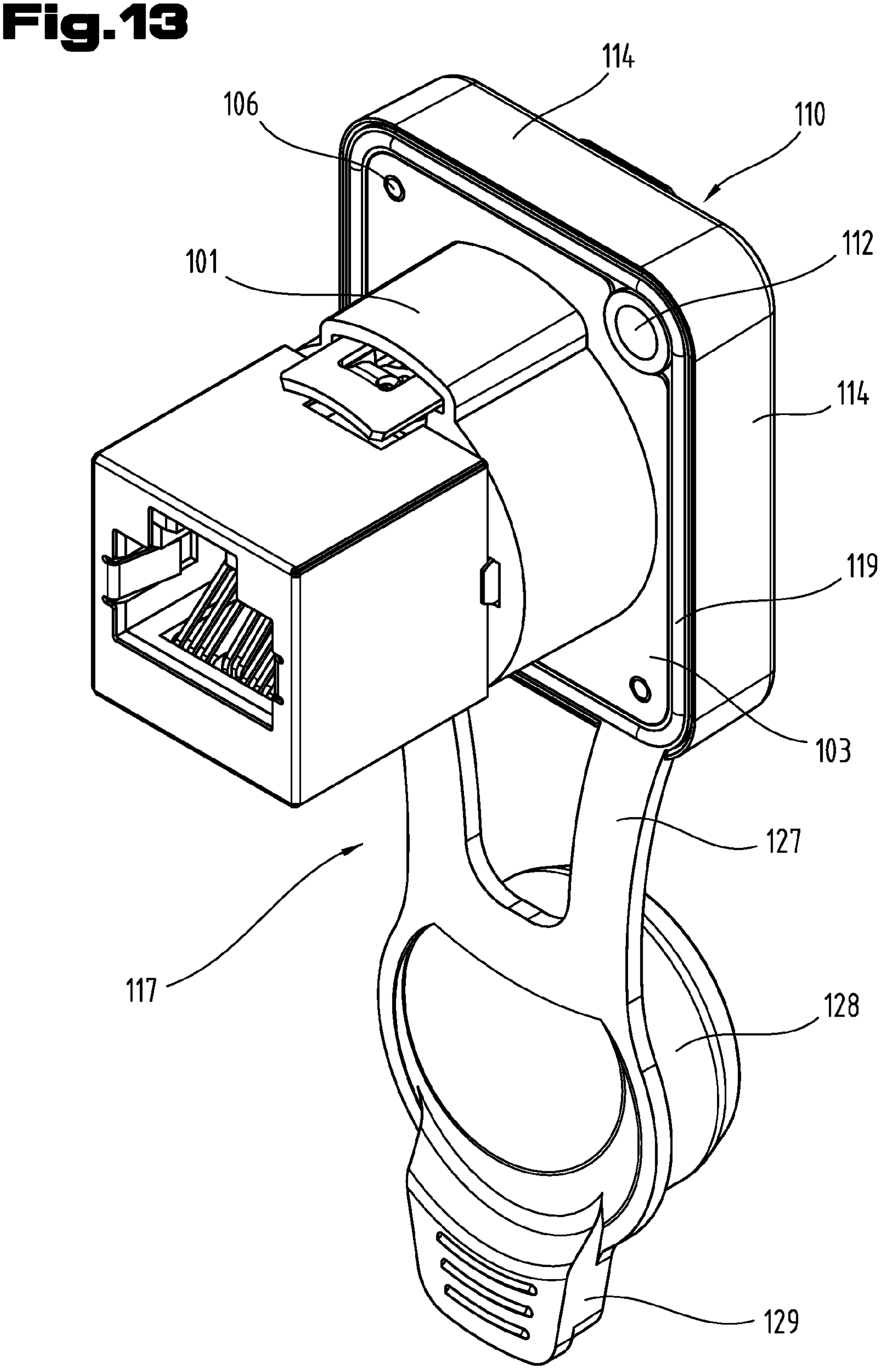
Figure 14:
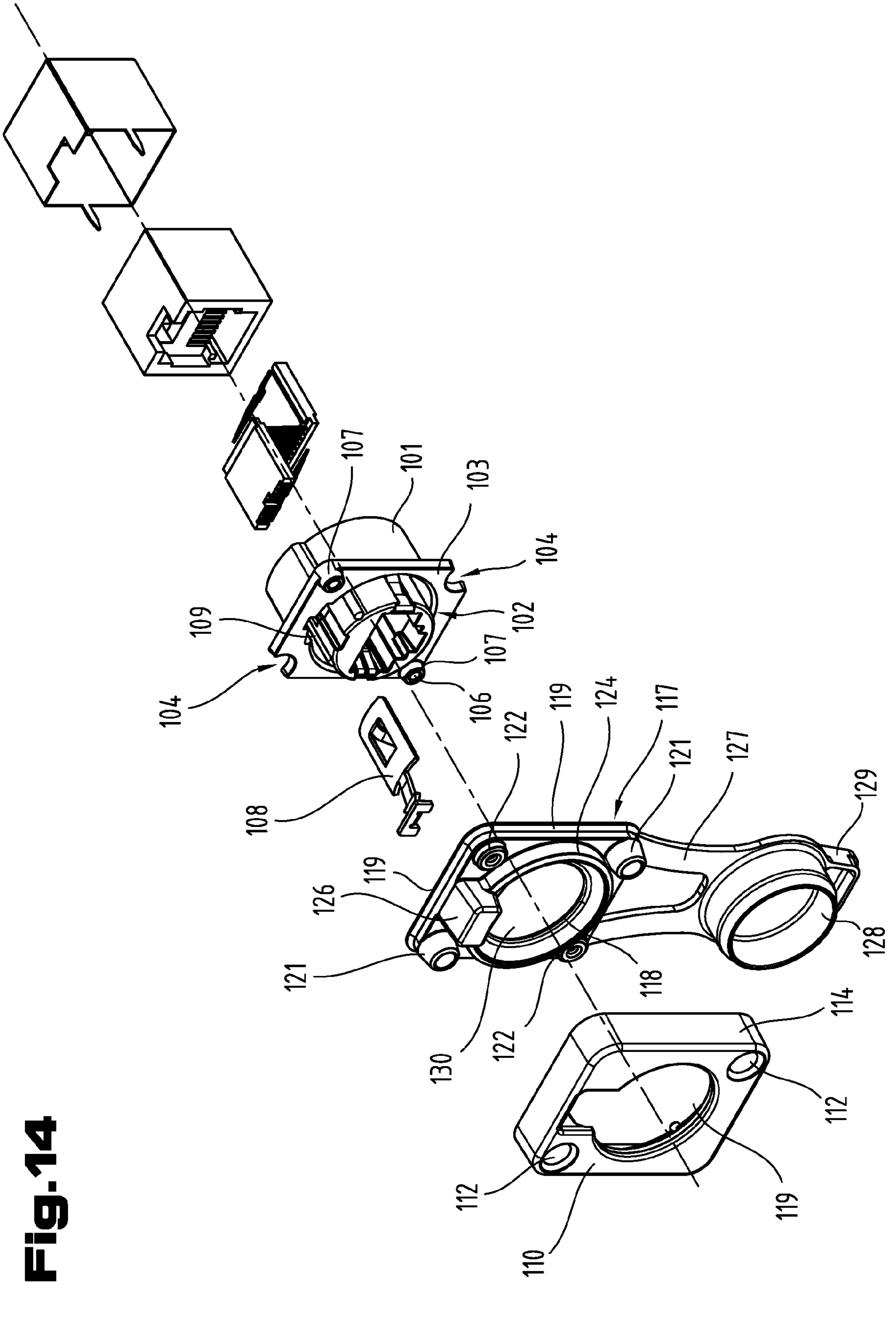
Figure 15:
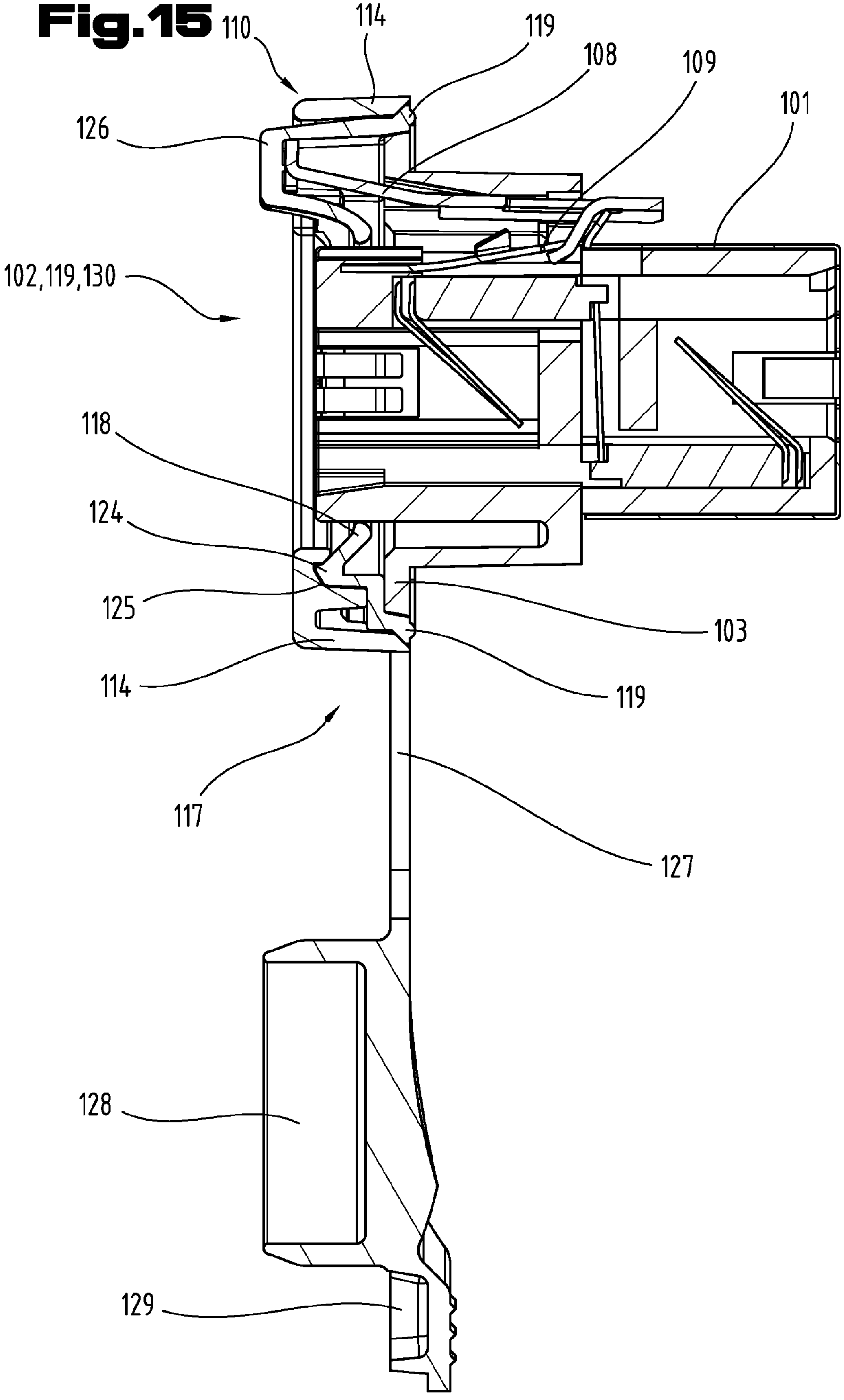
Figure 16:
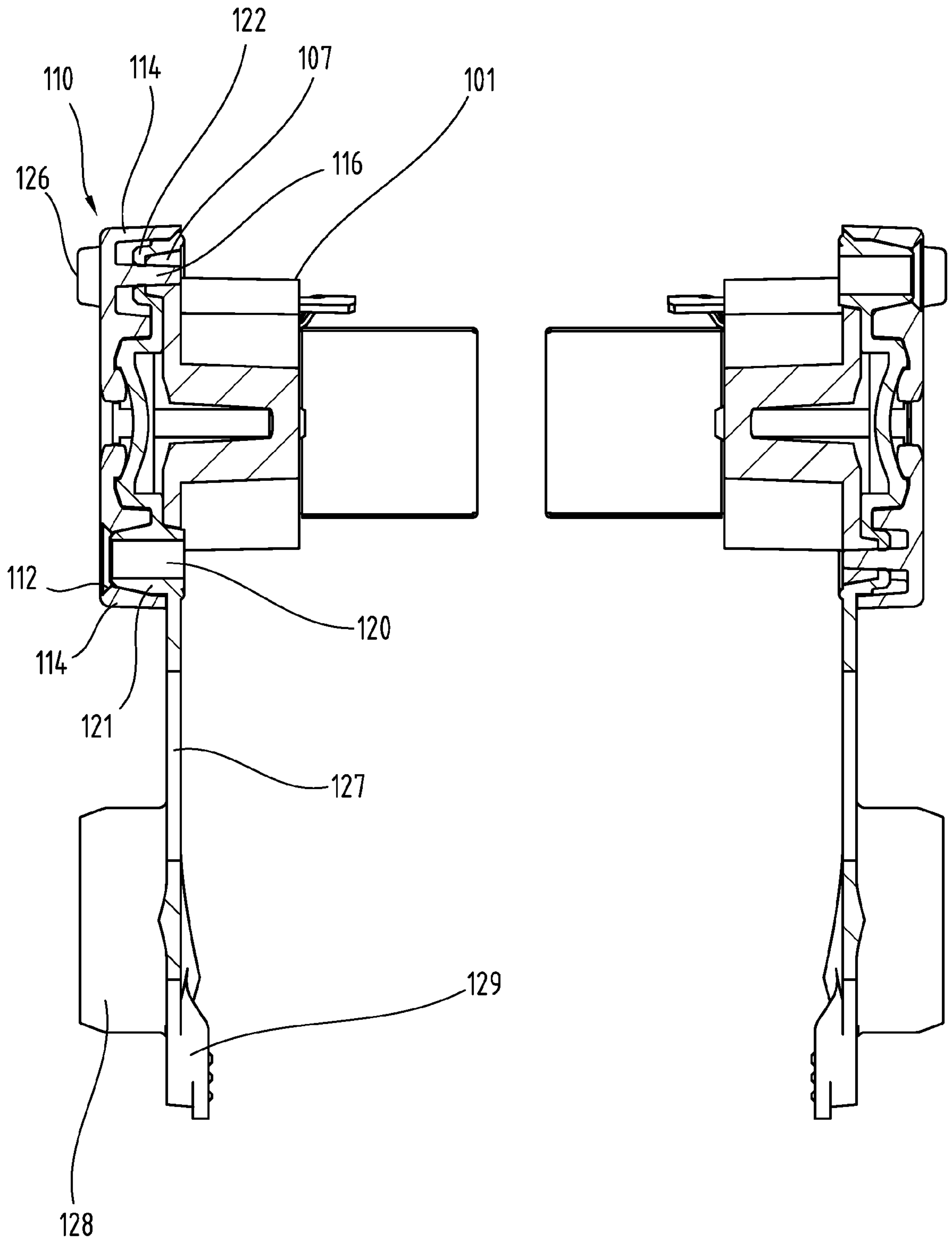
Figure 17:
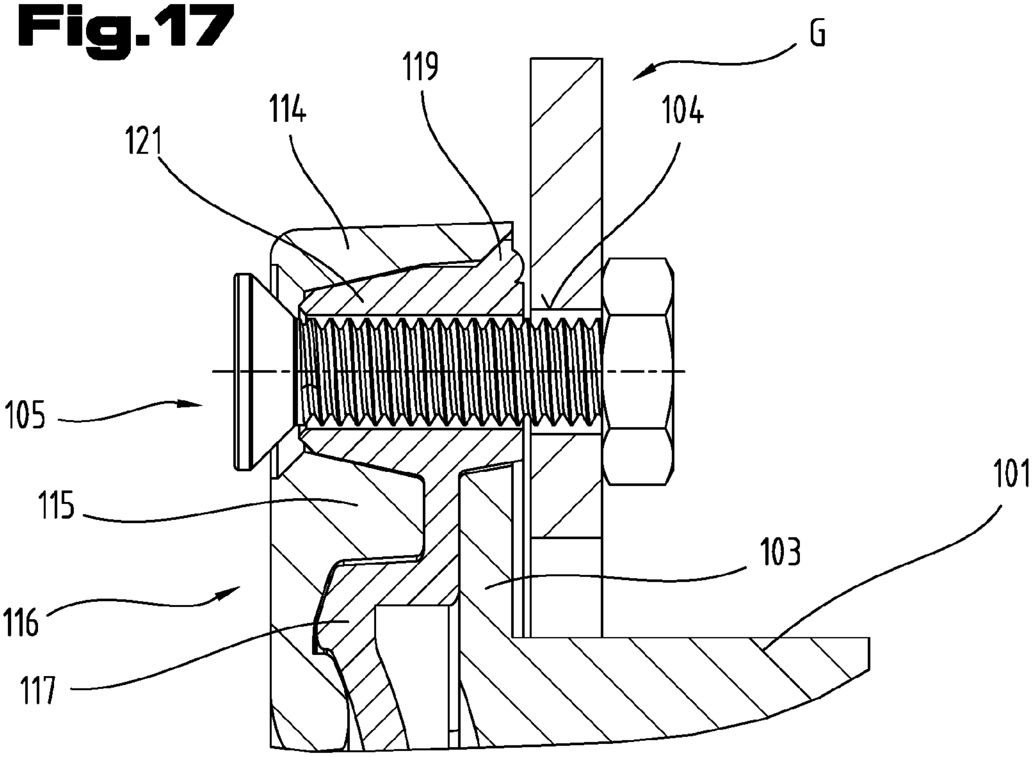
Figure 18:
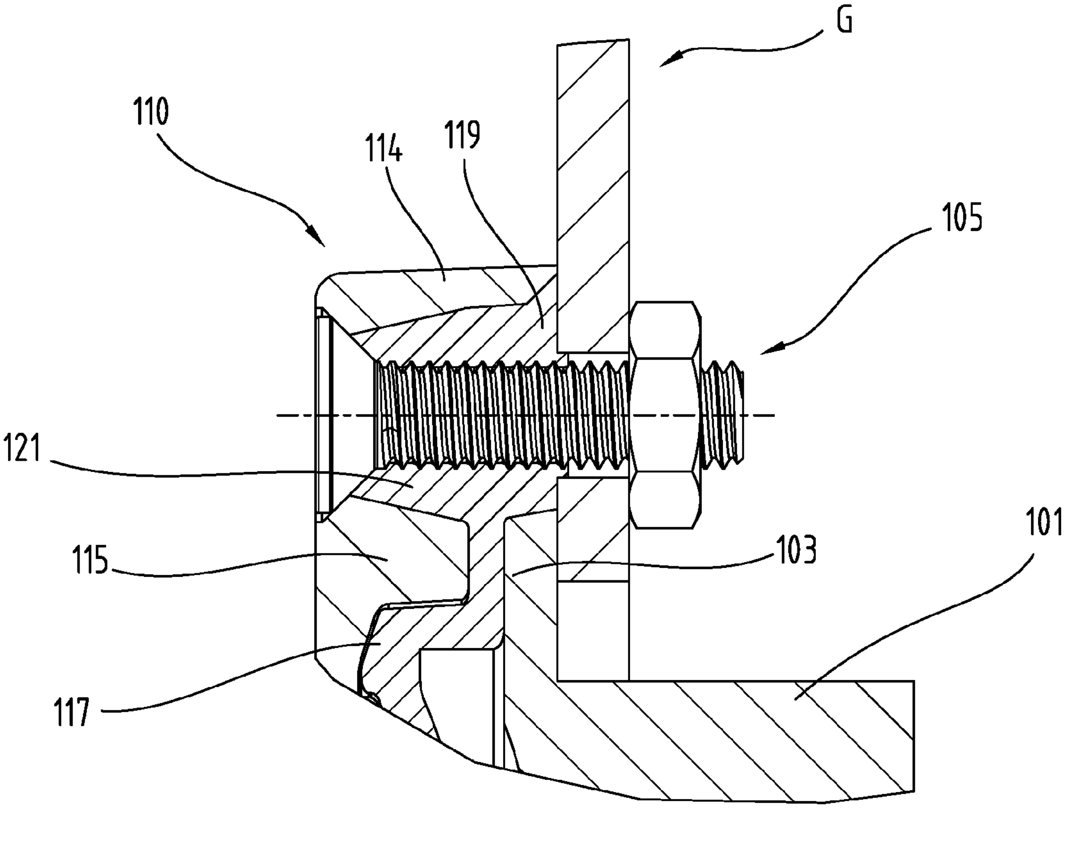
Figure 19:
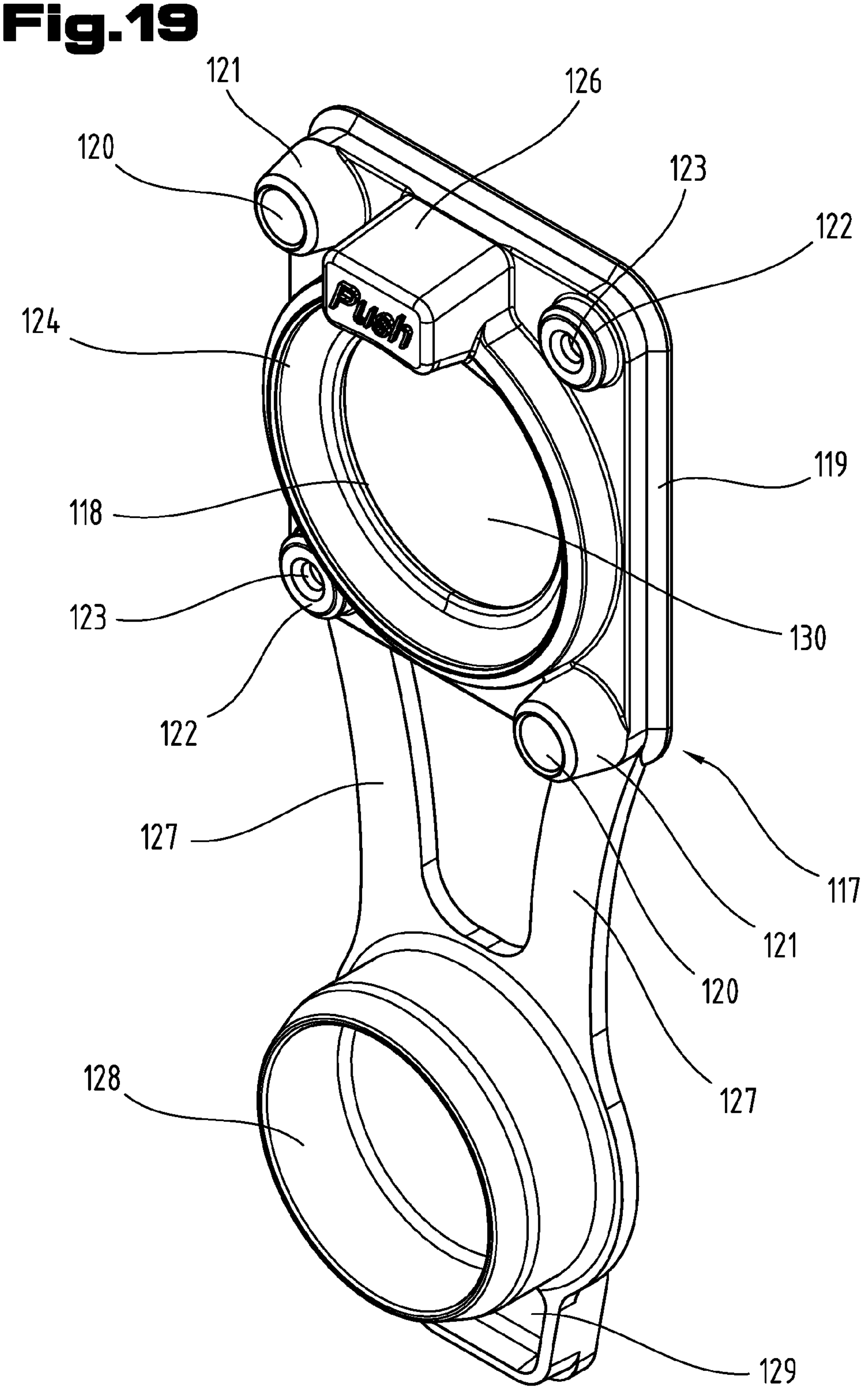
Figure 20:
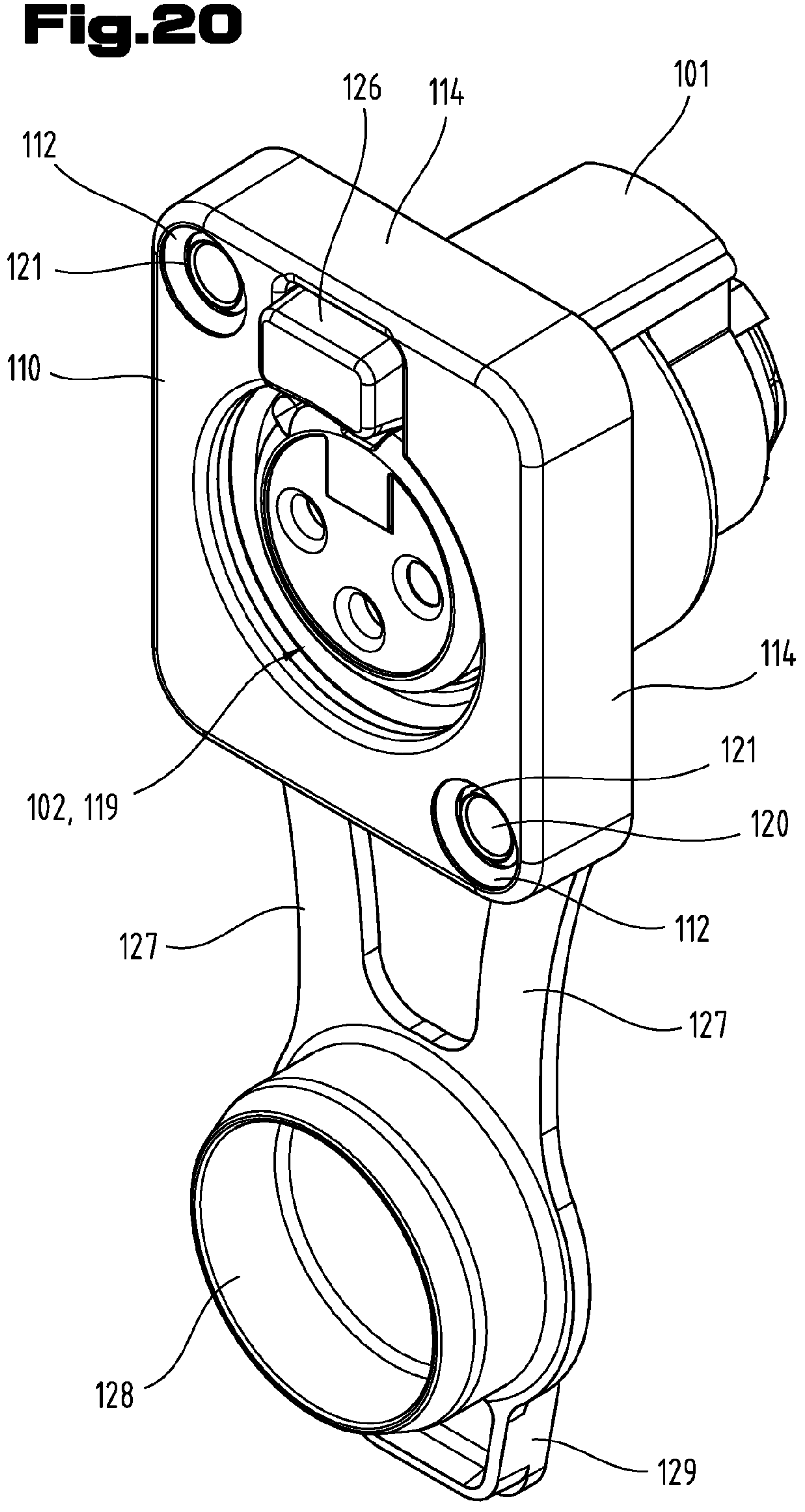
Figure 21:
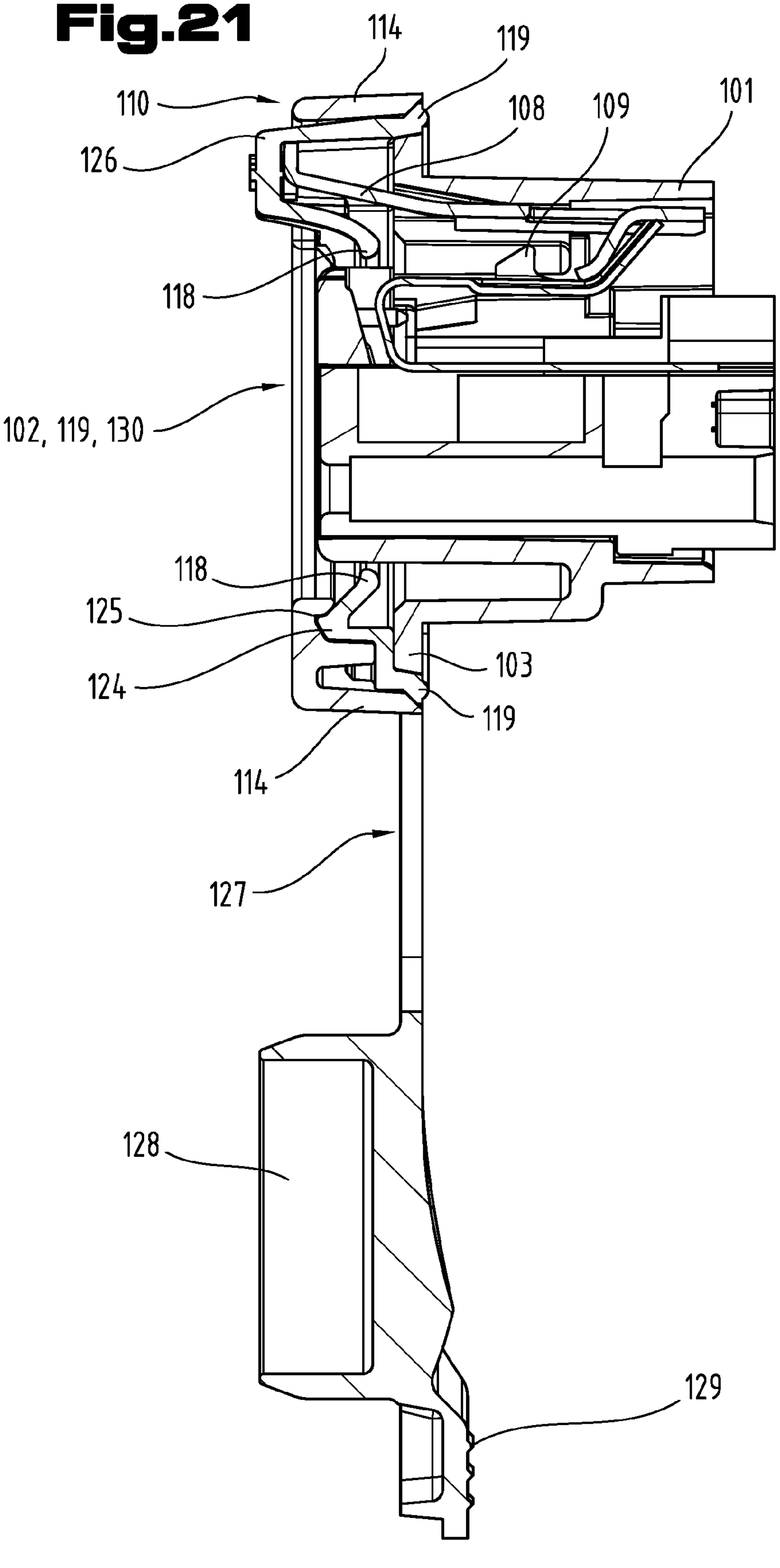

These show in a respectively very simplified schematic representation:

FIG. 1 a built-in plug connector according to the invention in an XLR embodiment as viewed from the front in the insertion direction;

FIG. 2 the built-in plug connector of FIG. 1 in the side view;

FIG. 3 a vertical section through the built-in plug connector of FIG. 1 in the installed state, along the line III-III;

FIG. 4 an exploded view of the built-in plug connector of FIG. 1 as viewed obliquely from the front;

FIG. 5 an exploded view of the built-in plug connector of FIG. 1 as viewed obliquely from the rear;

FIG. 6 a further embodiment of a built-in plug connector according to the invention, in this case in an embodiment for RJ45 data plugs, as viewed from the front in the insertion direction;

FIG. 7 the built-in plug connector of FIG. 6 in the side view;

FIG. 8 the built-in plug connector of FIG. 6 in a rear view;

FIG. 9 a vertical section through the built-in plug connector of FIG. 6 in the installed state, along the line IX-IX;

FIG. 10 an exploded view of the built-in plug connector of FIG. 6 as viewed diagonally from the front;

FIG. 11 an exploded view of the built-in plug connector of FIG. 6 as viewed diagonally from the rear;

FIG. 12 an oblique view from the upper front of a first embodiment of a built-in plug connector according to the invention according to a different variant of the invention;

FIG. 13 a view rotated by 180 degrees;

FIG. 14 an exploded oblique view from the upper front;

FIG. 15 a cross-section exactly in the central plane of the built-in plug connector of FIGS. 1 to 3;

FIG. 16 a cross-section in a parallel plane, which contains the central axes of the fastening bores and of the retaining pins;

FIG. 17 a detailed cross-section in the region of the fastening bores with an inserted fastening screw;

FIG. 18 a detailed cross-section in the region of the fastening bores with an inserted and tightened fastening screw;

FIG. 19 an advantageous embodiment of a seal for a built-in plug connector to a greater scale;

FIG. 20 an oblique view from the upper front of a further embodiment of a built-in plug connector according to the invention;

FIG. 21 a cross-section exactly in the central plane of the built-in plug connector of FIG. 7;

and

Figure 22:
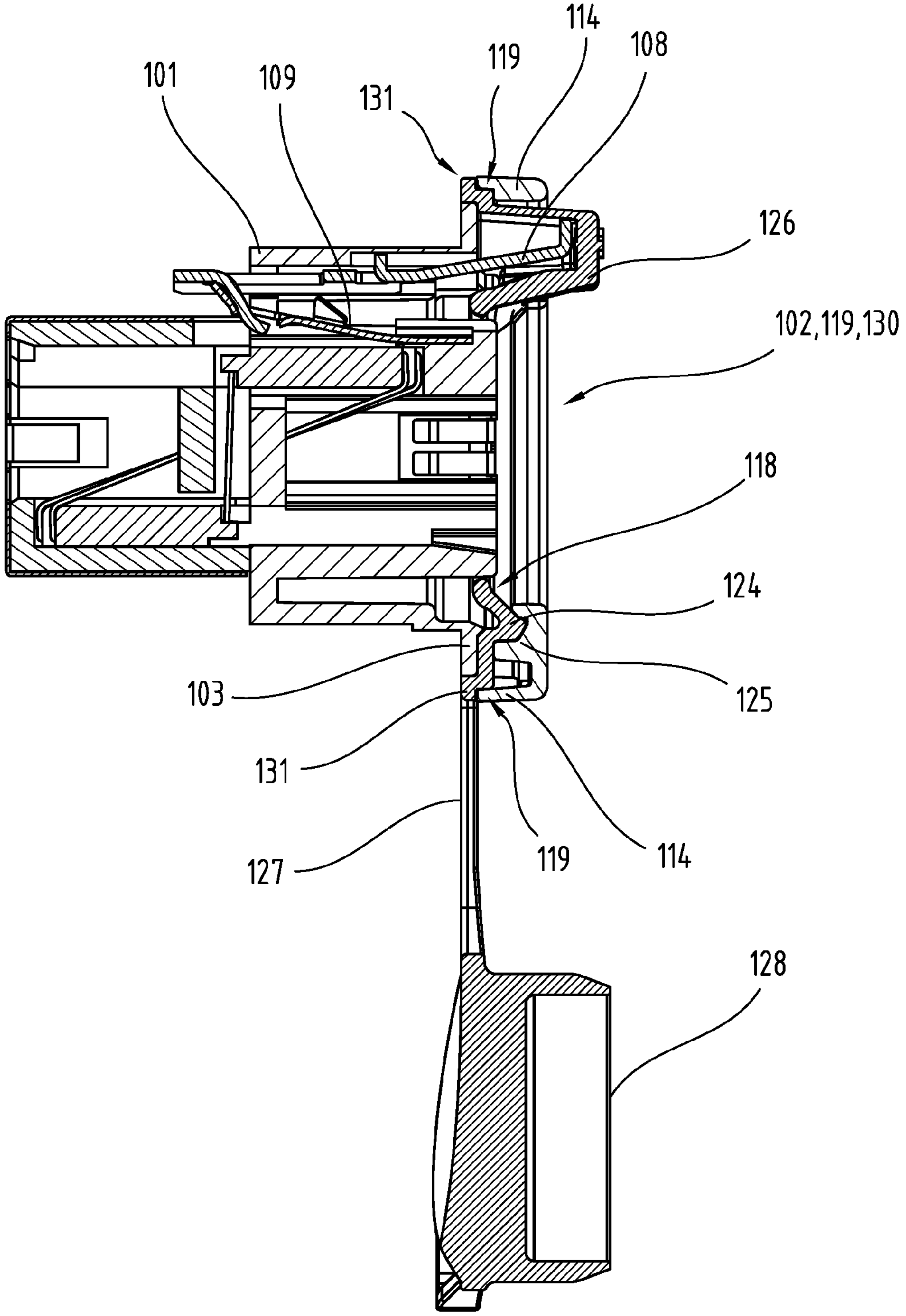

FIG. 22 a cross-section through a further embodiment of a built-in plug connector, with a sealing edge chamfered in a stepped manner.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows by way of example a first embodiment of a built-in plug connector according to the invention in the form of a chassis socket for XLR plug connections. Of course, the structure according to the invention can also be transferred to other types of built-in plug connector, which is explained by way of example with the further exemplary embodiment of FIGS. 6 to 11, which show an RJ45 data plug chassis socket. In the following description, equal reference numbers and/or component designations are used for equal parts. In order to avoid unnecessary repetitions, it is pointed to/reference is made to detailed description already given.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The electrical built-in plug connector of FIGS. 1 and 2, shown in a section in FIG. 3 and in exploded views in FIGS. 4 and 5, comprises a housing 1 with an insertion opening 2 for a complementary plug connector (not shown). On the insertion-side end, on the front side of the housing 1, a projecting connecting flange 3 is provided, which protrudes in a preferably orthogonal manner from the housing 1 and preferably over its entire circumference.

The connecting flange 3 also has passage openings or partially open through holes 4, through which fastening means, typically fastening screws, rivets, or the like, for the built-in plug connector can be guided, in order to fix it from the rear side, i.e. the side opposite the insertion side, in a mounting bore on a device wall, a control panel, or in similar elements. For this purpose, the fastening means engage with fastening bores in the device wall, control panel, or the like. The through holes 4 are preferably positioned in two corners of the connecting flange 3, which is rectangular here, opposite one another with respect to a central axis of the insertion opening 2. Of course, other silhouettes of the connecting flanges 3 are also possible, for example a circular outline, a polygonal chain, or the like. It is also possible for passage openings 4 to be present in all corners of the connecting flange 3.

Although other types of construction are also possible for the housing 1 and the fixing of the electrical contact elements 8 in the housing 1, the figures show a preferred embodiment having a separate contact carrier 6 inserted into the housing 1. For this purpose, the housing 1 is made up of two concentrically arranged housing parts, an outer housing part 11 and an inner housing part 12, which are spaced from one another by an annular gap 13, wherein said annular gap 13 forms an annular insertion opening for a plug projection, in the form of a socket, of a complementary cable connector. An annular bottom 14 connects the two housing parts 11, 12 at the end of the housing 1 located opposite the insertion opening 2. The cylindrical volume inside the internal housing part 12 forms the receptacle for the contact carrier 6, which is fixed therein preferably by means of locking, possibly also by means of adhering, pressing in, or clamping by means of the rear cover 7. By means of this cover 7, the rear end of the housing 1 is preferably closed in an air-tight and water-tight manner, wherein the cover 7 can be welded, preferably by means of ultrasonic welding, adhered, or connected in any desired positively locking or materially bonded manner, to the housing 1. Only the rear ends of the electrical contact elements 8, which are fixed in the contact carrier 6, preferably by pressing, adhering, or similar methods, and of the ground contact 9 penetrate, in a sealed manner, the cover 7 and protrude out of the housing 1 towards the rear.

Finally, a locking arrangement is positioned in or on the housing 1, which locking arrangement has at least one locking element 10, in order to prevent an inadvertent unplugging of the plugged complementary plug connector. This locking element 10, preferably a locking spring, can be compressed by means of an actuating element 15 for releasing the complementary plug connector. This actuating element 15 protrudes beyond the insertion-side end of the housing 1 towards the front and beyond the front side of the connecting flange 3, so a user can reach and actuate it well.

As will be explained in the following in combination with the specific embodiment of, in particular, the connecting flange 3 and a seal 5 arranged on the front side of the connecting flange 3, the built-in plug connector according to the invention is designed for mounting in a completely assembled configuration and with all components including the seal 5 on the inside of the device wall, the rear side of the control panel, or similar electrical or electronic devices.

This seal 5 has a central, preferably circular cutout 16 in the region of the insertion opening 2 of the housing 1, which cutout 16 is limited along its circumference by a sealing lip 17, which protrudes radially into the cutout 16 and the insertion opening 2. In a plate-shaped part 18 of the seal 5, passages 19 for feeding through the fastening means for the built-in plug connector are recessed coaxially with the through holes 4 in the housing 1.

The seal 5 along with the plate-shaped part 18 is inserted into a depression 20, which is formed in the insertion-side surface of the connecting flange 3 and is accordingly configured therefor. The passage openings 4 for the fastening means are preferably arranged inside the depression 20. The seal 5 covers with its plate-shaped part 18 preferably all insertion-side structures located inside the depression 20 in the region of the connecting flange 3. For accurately positioning the seal 5 as well as ensuring a defined sealing force, the depression 20 for the seal 5 is bounded by a web 21 on the connecting flange 3 extending along the outer circumferential edge of the depression 20 and raised towards the insertion side over the front surface of the connecting flange 3. On the outer edge of the connecting flange 3, this web 21 preferably forms a contact line with the device wall, the wall of the control panel, or the like, over the entire circumference, so that the fastening screws, for example, can be tightened to a stop and the seal 5 still only receives a predetermined defined pressure, as a minimum distance between the rear side of the device wall, the control panel, or the like, and the front side of the connecting flange 3 is ensured by the web 21. The adherence to narrowly defined tightening torques can thereby be avoided, as can the risk of destroying the seal 5 when applying to high of a tightening torque.

When tightening the fastening means in the course of mounting the built-in plug connector, the web 21 is pressed, on the circumferential edge of the depression 20 in the connecting flange 3, which also surrounds the plate-shaped part 18 of the seal 5, onto the rear side of the device wall, the control panel, or the like, wherein, however, particularly the plate-shaped part 18 surrounding the mounting bore on all sides is completely covered and protected by the connecting flange 3. As an alternative thereto, a construction could be chosen, in which, in the assembled state, the circumferential web 21 is lower than the thickness of the seal 5 in the region of the connecting flange 3, so that the seal 5 can give way outwardly when fastening the built-in plug connector and tightening the fastening means between connecting flange 3 and device wall, control panel, or the like. It would also be conceivable that an outwardly projecting sealing seam is clamped between the web 21 and the device wall, control panel, or the like.

In the shown example, the seal 5 fills in the depression 20 essentially completely. In this regard, the web 21 has a height that is slightly smaller than the thickness of the seal 20, in particular of its plate-shaped part 18, along the circumferential edge. The inner side of the web 21 may be outwardly slanted, just like the outer side of the plate-shaped part of the seal 5 may be slanted in a complementary manner thereto.

Sealing grommets 22 are integrally formed onto the front side of the plate-shaped part 18 of the seal 5, i.e. on its insertion-side surface. These sealing grommets 22 surround the passages 19 for feeding through the fastening means in the form of sealing rings, they are situated, when the plug connector is installed, inside the fastening bores in a device wall, control panel, or the like, and preferably protrude slightly towards the side of the same opposite the built-in plug connector (see FIG. 2). In this regard, the outer diameter of the sealing grommets 22 preferably corresponds to the inner diameter of the fastening bores. For an optimal sealing effect, the inner diameter of the sealing grommets 22 further corresponds to the outer diameter of the fastening means, more precisely here, the inner diameter is determined in that section in which the shaft of the fastening means, for example the threaded section of a fastening screw, is accommodated in the fastening bore of the device wall, control panel, or the like.

In an unloaded state, the sealing grommets 22 end—as can be seen in FIG. 3—slightly above the lower edge of the fastening bore. After tightening the fastening means, wherein the built-in plug connector is pulled up to the rear side of the device wall, the control panel, or the like, and this process, the sealing grommet 21 is further pulled into the fastening bore, the material of the sealing grommets 22 is finally squeezed between the fastening means, the inside of the mounting bore, and the connecting flange 3, and thus optimally seals the region of the fastening means.

The inner diameter of the sealing grommets 22 preferably is greater than the outer diameter of the fastening means, in particular in the case of fastening screws, where this outer diameter is the nominal diameter of the thread. At a minimum, the inner diameter of the sealing grommets 22 in an unloaded state is to correspond to the outer diameter of the fastening means.

When the fastening means is completely tightened, however, the sealing grommet 22 is compressed and its material clings to the inner wall of the fastening bore and enters, if present, even between the threads of fastening screws. When using fastening means having a flat head, a sealing effect is in place also at the top, insertion-side edge of the sealing grommet 22 due to the contraction of the components with compression of the material of the sealing grommets 22, so that, in combination, an optimal sealing effect results over the entire height of the sealing grommet 22.

In case of the built-in plug connector shown by way of example in the figures, the insertion opening 2 is bounded at least over a part of its circumference by a circular web 23 rising above the base of the recess 20 for the seal 5.

The side of the seal 5 facing the connecting flange 3 has a recess 24, which, upon insertion of the seal 5 into the depression 20 of the connecting flange 3, accommodates the web 23. Advantageously, this recess 24 is formed through the rear side of a rim 25 of the seal 5 raised on the insertion side. This rim 25 is located within the mounting bore in the device wall, control panel, or the like, when the built-in plug connector is installed. Similarly to how it was described for the sealing grommets 22, the outer diameter of the rim 25 preferably corresponds to the inner diameter of the mounting bore, which ensures an optimal sealing effect. Radially towards the inner side, the sealing lip 17 connects directly to the rim 25, which sealing lip 17 seals the insertion opening when the complementary plug connector is plugged in by abutting on its surface.

The web 23 is typically only interrupted in that region through which the actuating element 15 extends, and thus preferably extends over more than 80% of the circumference of the insertion opening 2. Starting from the insertion opening 2, a through hole 26 extends radially outwardly in the shown preferred embodiment, through which through hole 26, in the assembled and installed state, the actuating element 15 for the locking mechanism protrudes from the housing 1 towards the outside. In this regard, the outwardly protruding section of the actuating element 15 is covered by a dome 27, which is preferably integrally formed directly onto the seal 5. The dome 27, as well, protrudes through the mounting bore, which must also have a corresponding through hole in an otherwise circular section, outwardly to the side of the device wall, control panel, or the like, opposite the built-in plug connector. In this regard, the dome 27 is preferably a section of the rim 25.

Finally, the seal 5 can be improved even further in that at least one radially protruding connecting strip 28 is integrally formed thereon, preferably starting from the rim 25, at a small distance above the front surface of the plate-shaped part 18 of the seal 5. Thereby, it is possible that the built-in plug connector can be mounted in its entirety, with the seal 5 and their plate-shaped part 18, in the depression 20 on the rear side of the device wall, the control panel, or the like, and the rim 25, the sealing grommets 22, and the dome 27 rest on the front side of the device wall, the control panel, or the like opposite the built-in plug connector, and the connecting strip 28 extends on said front side, away from the rim 25.

To the outer end of the connecting strip 28, a preferably open, pot-shaped sealing plug 29 is fastened, which can be plugged into the insertion opening 2 and/or the cutout of the seal 5 bounded by the sealing lip 17 and seals this cutout 16 tightly. For this purpose, the outer diameter of the cylindrical section of the sealing plug 29 is preferably slightly greater than the inner diameter of the sealing lip 17 of the central cutout 16. For easier handling, a full-surface gripping lug 30 preferably protrudes on the side of the sealing plug 29 opposite the connecting strip 28. If this gripping lug 30 preferably also has an open, pot-shaped design like the embodiment shown here, it covers the dome 27 and protects it from damage when the sealing plug 29 is plugged in.

For easier handling of the sealing plug 28, a full-surface gripping lug 29 protrudes on the side of the sealing plug 28 opposite the connecting strip 27. Preferably, this gripping lug 29 also has an open pot-shaped design, wherein its opening is oriented in the same direction as the dome 27 sealing the actuating element 15 and is positioned in one line with this dome 27 and the central axis of the insertion opening 2. When folding the connecting strips 28 for inserting the sealing plug 29 into the insertion opening 2, this results that the dome 27 is simultaneously covered and protected by the pot-shaped gripping lug 30.

FIG. 6 shows by way of example a second embodiment of a built-in plug connector according to the invention in the form of a chassis socket for a data plug, in particular an RJ45 data plug, in a perspective view.

The electrical built-in plug connector of FIGS. 6 to 8, shown in a section in FIG. 9 and in exploded views in FIGS. 10 and 11, comprises a housing 1 in this embodiment, as well. In this further embodiment, this housing 1 is formed integrally with the central contact carrier 6. In the housing 1 and/or the contact carrier 6 formed therein, the insertion opening 2 pointing forwards is provided for the complementary plug connector, wherein again, an annular gap 13 surrounds the central contact carrier 6 and forms an annular insertion opening for a socket-shaped plug extension of the complementary plug connector. In this case, the contact carrier 6 is configured for data contacts, for example in the RJ45 format. A locking arrangement for the complementary plug connector is also provided, which locking arrangement is constructed as explained above and can be unlocked by means of the actuating element 15.

In addition to the socket-like receptacles 31 for the fastening means for mounting the housing 1 on the rear side of a device wall, control panel, or the like, the housing variant shown has feed-throughs 32 in the connecting flange 3 for optical fibers 33 or similar elements, light-conducting or also light-diffusing. Of course, in that case, corresponding feed-throughs 34 for said optical fibers 33 are also formed in the seal 5, in particular its plate-shaped part 18, covering the insertion-side surface of the connecting flange 3, and envelop the same in a dust-tight and moisture-tight manner.

From the rear side, i.e. from the side opposite the insertion side, a sealing housing 35 is pushed over the housing 1 with the contact carrier 6. This sealing housing 35 has a projection 36 on the front end, by means of which it envelops and covers the connecting flange 3 on the housing 1. In this regard, the connecting flange 3 is also enveloped by an insertion-side front circumferential edge 37 of the projection 36 of the sealing housing 25. This circumferential edge 37 protrudes from the rear beyond the front side of the connecting flange 3 including the seal 5, in particular its plate-shaped part 18, towards the front and assumes the function of the circumferential web 21 of the first embodiment. The circumferential edge 37 of the sealing housing 35 forms, together with the front surface of the connecting flange 3, the depression for inserting the seal 5, in particular for its plate-shaped part 18, and forms, over its entire circumference, a contact line with the rear side of the device wall, the wall of the control panel, or the like, and also defines a minimum distance therefrom, so that the fastening means can be tightened to a stop, and the seal 5 still receives only a predetermined defined pressure.

Again, the adherence to narrowly defined tightening torques can be avoided, as can the risk of destroying the seal 5 due to too much compression.

The sealing housing 35 further has socket-shaped receptacles 38 for the fastening means, through which the sealing housing can be fastened to the rear side of the device wall, the control panel, or the like, and thus be tightened until the circumferential edge 37 abuts the device wall, the control panel, or the like. The seal 5 is then clamped and compressed between the device wall, the control panel, or the like, the connecting flange 3, and the circumferential edge 37, in order to thus ensure the sealing effect around the mounting bore of the housing 1 and all feed-throughs in the device wall, the control panel, or the like, in the connecting flange and in the sealing housing 35.

For the optical fibers 33, passages 39 are provided on the rear side of preferably the projection 36 of the sealing housing 25 and envelop these optical fibers 33 in a dust-tight and moisture-tight manner. By means of passages 40 with an equally dust-tight and moisture-tight design, the ends 41 of the contacts of the contact carrier 6, provided for connecting to external connections, are guided outwards on the rear side of the sealing housing 35.

Furthermore, the seal 5 is designed in the same manner as has been described in the context of the first embodiment.

FIG. 12 shows by way of example a first embodiment, according to the invention, of a built-in plug connector according to a variant of the invention, in the form of a chassis socket for a data plug, in particular an RJ45 data plug, in a perspective view. Of course, the structure according to the invention can also be transferred to other types of built-in plug connector, which is explained by way of example with the further exemplary embodiment of FIGS. 20 and 21, which show an XLR chassis socket.

The electrical built-in plug connector of FIG. 12, shown in detail in an exploded view in FIG. 14, comprises a housing 101 with an insertion opening 102 for a complementary plug connector (not shown). On the insertion-side end, on the front side of the housing 101, a projecting connecting flange 103 is provided, which protrudes in a preferably orthogonal manner from the housing 101 and preferably over its entire circumference. The connecting flange 103 also has passage openings or partially open through holes 104, through which fastening means 105, typically fastening screws, rivets, or the like, for the built-in plug connector can be fed, in order to fasten it on a device wall G, a control panel, or similar elements (in this regard, see FIG. 17). The through holes 104 are preferably positioned in two corners of the connecting flange 103, which is rectangular here, opposite one another with respect to a central axis of the insertion opening 102. Of course, other silhouettes of the connecting flanges 103 are also possible, for example a circular outline, a polygonal chain, or the like.

It is also possible for passage openings 104 to be present in all corners of the connecting flange 103.

At other points of the connecting flange 103, there are retaining bores 106, which are bounded by rings 107 rising above the front side of the connecting flange 103. Typically, two retaining bores 106 are positioned in two corners of the connecting flange 103 opposite one another with respect to a central axis of the insertion opening 102. In these retaining bores 106, complementary retaining elements of other components can be inserted. These retaining bores 106 are preferably provided in the center of rings 107 rising over the connecting flange 103. Finally, in or on the housing 101, a locking arrangement 108, 109 is also positioned, the at least one locking element 109 of which may also be unlocked by means of an actuating element 108. This actuating element 108 protrudes beyond the insertion-side end of the housing 101 towards the front, so a user can reach it well.

In the assembled state of the built-in plug connector, a flange plate 110 on the insertion side is located opposite the front side of the connecting flange 103 of the housing 101. This flange plate 10 has an insertion opening 111 for the complementary plug connector in a coaxial arrangement relative to the insertion opening 102 of the housing 101. Moreover, mounting bores 112 are formed in the flange plate 110, positioned coaxially to the through holes 104 in the connecting flange 103 and designed for feeding through fastening means 105 for the built-in in plug connector for connecting to a device wall, a control panel, or the like. At that location at which the actuating element 108 is arranged, a recess 113 directed radially outwards extends from the insertion opening 111, through which recess 13 the actuating element 108 can protrude towards the front side of the flange plate 110.

The outer edge 114 of the flange plate 110 is bent up towards the housing 101 and overlaps—this can be seen better in the rear view of the built-in plug connector in FIG. 13 and in the cross-section of FIG. 15—the outer edge of the connecting flange 103. On the rear side of the flange plate 110, the mounting bores 112 preferably have socket-shaped extensions 115 in the direction towards the connecting flange 103 and preferably extend up to the contact with this connecting flange 103.

At positions which correspond to the retaining bores 106 of the connecting flange 103, the flange plate 110 has retaining pins 116 protruding towards the housing 101. Their ends are designed for insertion and fixation in the retaining bores 106 of the connecting flange 103. They may possibly also be inserted into the retaining bores 106 completely and until contacting the housing wall, control panel, or the like, and act as a spacer.

A preferably plate-shaped seal 117 for sealing against the device wall G, the control panel, or the like is inserted directly between the flange plate 110 and the connecting flange 103 of the housing 101 and held clamped between said components. This seal 117 has a central cutout 130, which corresponds at least to the insertion opening 102 in size and which is arranged coaxially thereto. This central cutout 130 is bounded by a circumferential sealing lip 118, which protrudes radially into the insertion opening 102 and seals the annular gab of the insertion opening 102 when the complementary plug connector is plugged in.

The edge 119 of the seal 117 is bent up towards the housing 101 in the region of the flange plate 110 and the connecting flange 103 and overlaps the outer circumferential edge of the connecting flange 103 with said bent-up edge strip 119. On the other hand, the bent-up edge 119 of the seal 117 itself is overlapped by the bent-up outer edge 114 of the flange plate 110. The relative thicknesses of the seal 117 and connecting flange as well as the height of the outer edge 114 are selected such that, in the assembled state, the circumferential edge 114 of the flange plate 110 extends at maximum to the height of the rear side of the connecting flange 103 of the housing 101, and the edge 119 of the seal 117 protruding towards the housing 101 is higher than the rear surface of the connecting flange 103 over the entire circumference of said connecting flange 3 and is ultimately pressed against the wall of the device housing, the control panel, or the like and fulfills the sealing function when the built-in plug connector is installed. At the location of the mounting bores 112 of the flange plate and/or the through holes 104 of the connecting flange 103, passage openings 120 are formed in the seal 117, as well.

As can be seen well in FIGS. 17 and 18, in a preferred embodiment of the invention, the inner side of the bent-up edge 114 of the flange plate 110 is designed so as to be slanted outwardly. The seal 117, as well, or rather its bent-up edge 119, is also designed to be slanted outwardly, preferably so as to complement the slanting of the flange plate 110. As shown in FIG. 18, when tightening the fastening screw 105 during mounting of the built-in plug connector, the edge 119 of the seal 117 is pressed on the device wall G, the control panel, or the like, wherein the seal, however, is preferably completely covered and protected by the flange plate 110. As an alternative thereto, a construction according to FIG. 22 could also be selected, in which, in the assembled state, the circumferential edge 114 of the flange plate 110 ends before the height of the rear side of the connecting flange 103 of the housing 101, and a circumferential sealing edge 131 projecting outwards covers at least a part of the thickness of the edge 114, which is bent up towards the housing 101, of the flange plate 110.

As is also clearly shown in FIGS. 17 to 19, according to a preferred embodiment, the seal 117 has sealing grommets 121 integrally formed onto the seal 117 at the locations of the mounting bores 112, which sealing grommets 21 protrude upwards towards the rear side of the flange plate 110. These sealing grommets 121 extend, in the assembled state, inside the mounting bores 112 of the flange plate 110, in particular also inside their socket-shaped extension 115, wherein their outer diameter preferably corresponds to the inner diameter of the mounting bores 112 and/or the extension 115. Here, the inner diameter is determined in that section, in which the shaft of the fastening means, that is preferably the threaded section of a fastening screw 105, is accommodated in the mounting bore 112.

In an unloaded state, the sealing grommets 121 end—as shown in FIG. 17—slightly above the lower edge of the accommodating region for the head of the fastening screw 105 in the mounting bore 112. After tightening the fastening screw 105, the material of the sealing grommets 121 is squeezed between the fastening screw 105, which is tightened until stop on the inner side of the mounting bore 112 of the flange plate 110, and the flange plate 110 and thereby seals the region of the screw head.

The inner diameter of the sealing grommets 121 preferably is to be greater than the outer diameter of the fastening means, in particular the fastening screws 105, wherein this outer diameter is the nominal diameter of the thread. At minimum, the inner diameter of the passage opening 120 of the sealing grommets 121 is to correspond, in the unloaded state, to the outer diameter of the fastening screws 105, as shown in FIG. 6. However, if the fastening screw 105 is tightened completely, the sealing grommet 121 is compressed, and the material of the sealing grommet 121 clings to the inner wall of the mounting bore 112 and enters between the threads of the fastening screw 105, whereby the state shown in FIG. 18 comes about. In combination with the positive locking connection in the region of the screw head, this results an optimal sealing effect across the entire height of the sealing grommet 121. At the positions of the retaining bores 106 on the connecting flange 103, the seal 117 preferably has domes 122 rising above its surface, which domes 22, in the assembled state of the built-in plug connector, overlap the rings 107 in an abutting manner. For feeding through the retaining pins 116 of the flange plate 110, the domes 122 have central openings 123, the diameter of which is preferably slightly smaller than the diameter of the retaining bore 106 and/or of the section of the retaining pin 116 to be inserted into the retaining bore 106.

As a further structure rising above the surface of the seal 117, a ridge 124 or protuberance is present, which surrounds the sealing lip 118 for the insertion opening 102 and the central cutout 130 radially outside. In the assembled state of seal 117 and flange plate 110, this ridge 124 is received in a corresponding groove 125, which coaxially surrounds the insertion opening 111.

In the region, in which, in the assembled state, the actuating element 108 protrudes through the flange plate 110, the ridge 124 terminates in a dome 126, which also rising above the surface of the seal 117 and, in its height, even further over the height of the ridge 124. This dome 126 advantageously formed integrally with the seal 117 also protrudes beyond the front side of the flange plate 110 and allows the user to actuate the actuating element 108 and thus the release of the locking of the complementary plug connector plugged into the built-in plug connector, which plug connector is held in the insertion opening 102 of the housing 101 by the locking arrangement 109 until then.

In addition to the sealing of the insertion opening 102 by means of the sealing lip 118 of the seal 117 when the complementary plug connector is plugged in, a possibility for sealing in an unplugged state was also desired. For this purpose, at least one radially protruding connecting strip is integrally formed onto the seal 117, projecting out from under the edge region 114 of the flange plate 110 bent towards the housing 101. Preferably,—as shown in the figures—two such connecting strips 127 are integrally formed onto the seal 117 in an approximately parallel or slightly V-shaped arrangement. At the outer end of these connecting strips 127, a sealing plug 128 is fastened, the outer diameter of which corresponds at maximum to the inner diameter of the insertion openings 102, 111 and which preferably is slightly greater than the inner diameter of the sealing lip 118 of the seal 117 sealing the insertion opening 102. Preferably, the sealing plug 128 has a pot-shaped design.

For easier handling of the sealing plug 128, a full-surface gripping lug 129 protrudes on the side of the sealing plug 128 opposite the connecting strip 127. Preferably, this gripping lug 129 also has an open pot-shaped design, wherein its opening is oriented in the same direction as the dome 126 sealing the actuating element 108 and is positioned in one line with this dome 126 and the central axis of the insertion opening 102. When folding the connecting strips 127 for inserting the sealing plug 128 into the insertion opening 2, this results that the dome 126 is simultaneously covered and protected by the pot-shaped gripping lug 129.

FIG. 22 shows a cross-section through a further embodiment of a built-in plug connector, with a sealing edge chamfered in a stepped manner.

LIST OF REFERENCE NUMBERS

| | |
|---|---|
| 1 | Housing |
| 2 | Insertion opening |
| 3 | Connecting flange |
| 4 | Through hole |
| 5 | Seal |
| 6 | Contact carrier |
| 7 | Cover |
| 8 | Contact elements |
| 9 | Ground contact |
| 10 | Locking element |
| 11 | Outer housing part |
| 12 | Inner housing part |
| 13 | Annular gap |
| 14 | Base |
| 15 | Actuating element |
| 16 | Cutout |
| 17 | Sealing lip |
| 18 | Plate-shaped part |
| 19 | Passage |
| 20 | Depression |
| 21 | Circumferential web |
| 22 | Sealing grommets |
| 23 | Circular web |
| 24 | Recess |
| 25 | Rim |
| 26 | Recess |
| 27 | Dome |
| 28 | Connecting strip |
| 29 | Sealing plug |
| 30 | Gripping lug |
| 31 | Receptacle |
| 32 | Feed-through |
| 33 | Optical fiber |
| 34 | Feed-through |
| 35 | Sealing housing |
| 36 | Projection |
| 37 | Circumferential edge |
| 38 | Receptacle |
| 39 | Passage |
| 40 | Passage |
| 101 | Housing |
| 102 | Insertion opening |
| 103 | Connecting flange |
| 104 | Through hole |
| 105 | Fastening screw |
| 106 | Retaining bore |
| 107 | Ring |
| 108 | Actuating element |
| 109 | Locking element |
| 110 | Flange plate |
| 111 | Insertion opening |
| 112 | Mounting bore |
| 113 | Recess |
| 114 | Bent-up edge |
| 115 | Socket-shaped extension |

-continued

| | |
|---|---|
| 116 | Retaining pin |
| 117 | Seal |
| 118 | Sealing lip |
| 119 | Bent-up edge |
| 120 | Passage opening |
| 121 | Sealing grommet |
| 122 | Dome |
| 123 | Central opening |
| 124 | Ridge |
| 125 | Groove |
| 126 | Dome |
| 127 | Connecting strip |
| 128 | Closing plug |
| 129 | Gripping lug |
| 130 | Central cutout |
| 131 | Sealing edge |
| G | Device wall |

The invention claimed is:

1. An electrical plug connector, in particular a built-in plug connector, for mounting on the rear side of a device wall, control panel, or the like, comprising a housing (1) with at least one insertion opening (2) for a complementary plug connector, preferably a cable plug, wherein a projecting connecting flange (3) protrudes on the insertion-side end of the housing (1), which connecting flange (3) has through holes (4) for feeding through fastening means, a seal (5) with a central cutout (16) in the region of the insertion opening (2), which central cutout (16) is bounded along its circumference by a sealing lip (17), which radially protrudes into the insertion opening (2), and with passages (19) for feeding trough fastening means, coaxially to the through holes (4), wherein the insertion-side surface of the connecting flange (3) as well as all insertion-side structures inside the boundary of the connecting flange (3) are covered by the seal (5).

2. The plug connector according to claim 1, wherein a depression for the seal (5) is recessed in the connecting flange (3) and is bounded by a web (21) on the connecting flange (3) extending along the outer circumferential edge of the depression.

3. The plug connector according to claim 2, wherein the seal (5) fills up the depression essentially completely, and the web (21) has a height which is slightly smaller than the thickness of the seal along its circumferential edge.

4. The plug connector according to claim 1, wherein a sealing housing (35) is slid from the rear side over the housing (1) and the connecting flange (3), wherein the connecting flange (3) is encompassed by an insertion-side front circumferential edge (37) of the sealing housing (35), which reaches forward to the front side of the connecting flange (3) including the seal (5).

5. The plug connector according to claim 2, wherein the inner side of the web (21) and/or circumferential edge (37) is slanted outwardly, and the outside of the seal (5) is slanted in a complementary manner thereto.

6. The plug connector according to claim 1, wherein the depression also contains the through holes (4) for feeding through the fastening means.

7. The plug connector according to claim 6, wherein sealing grommets (22) surrounding the passages (19) for feeding through fastening means are integrally formed onto the seal (5) on the insertion side, which sealing grommets (22), in the installed state of the plug connector, are situated inside the fastening bores of a device wall, control panel, or the like.

8. The plug connector according to claim 7, wherein the outer diameter of the sealing grommets (22) corresponds to the inner diameter the fastening bores.

9. The plug connector according to claim 7, wherein the inner diameter of the sealing grommets (22) corresponds to the outer diameter of the fastening means.

10. The plug connector according to claim 1, wherein the insertion opening (2) is bounded, at least over a part of its circumference, preferably over more than 80% of its circumference, by a circular web (23) rising on the insertion side above the base of the recess for the seal (5), wherein the seal (5) has a recess (24) for the web (23).

11. The plug connector according to claim 10, wherein the seal has a rim (25) raised on the insertion side for accommodating the web (23), which rim (25) is located within the mounting bore of a device wall, control panel, or the like when the plug connector is installed.

12. The plug connector according to claim 1, wherein a through hole (26) extends radially outwardly in the connecting flange (3) starting from the insertion opening (2), through which through hole (26), in the assembled and installed state, an actuating element (15) for a locking mechanism for the complementary plug connector protrudes from the housing (1) outwardly through the device wall, connecting flange, or the like, wherein a dome (27) integrally formed onto the seal (5), also protruding outwardly through the device wall, control panel, or the like, covers the actuating element (15).

13. The plug connector according to claim 12, wherein the dome (27) is a section of the rim (25).

14. The plug connector according to claim 1, wherein at least one radially protruding connecting strip (28) is integrally formed onto the seal (5), to the outer end of which connecting strip (27) a preferably pot-shaped sealing plug (29) is fastened, the outer diameter of which is slightly greater than the inner diameter of the sealing lip (17) of the central cutout (16).

15. A seal for use with the plug connector according to claim 1, with a cutout (16), which comes to rest in the region of an insertion opening (2) of the plug connector, and which is bounded by a sealing lip (17) along its circumference, which radially protrudes into the cutout (16), and with passages (19) for feeding through fastening means, wherein a plate-shaped part (18) of the seal (5) is designed to cover the front, insertion-side surface of the connecting flange (3) of the plug connector.

16. The seal according to claim 15, wherein the seal (5) is designed to be inserted into a depression of the insertion-side surface of a connecting flange (3) of the plug connector.

17. The seal according to claim 15, wherein sealing grommets (22) surrounding the passages (19) for feeding through fastening means are integrally formed onto the seal (5) on the insertion side, which sealing grommets (22), in the installed state of the plug connector, are situated inside the fastening bores of a device wall, control panel, or the like.

18. The seal according to claim 17, wherein the outer diameter of the sealing grommets (22) corresponds to the inner diameter the fastening bores.

19. The seal according to claim 17, wherein the inner diameter of the sealing grommets (22) corresponds to the outer diameter of the fastening means.

20. The seal according to claim 1, wherein the seal (5) has a rim (25) raised on the insertion side, which rim (25) is located within the mounting bore of a device wall, control panel, or the like when the plug connector is installed.

21. The seal according to claim 15, wherein a dome (27) is integrally formed onto the seal (5), which dome (27), in the installed state, protrudes outwardly through the device wall, control panel, or the like.

22. The seal according to claim 21, wherein the dome (27) is a section of the rim (25).

23. The seal according to one claim 15, wherein at least one radially protruding connecting strip (28) is integrally formed onto the seal (5), to the outer end of which connecting strip (27) a preferably pot-shaped sealing plug (29) is fastened, the outer diameter of which is slightly greater than the inner diameter of the sealing lip (17) of the central cutout (16).

24. The seal according to claim 23, characterized in that a full-surface gripping lug (30), which preferably has a pot-shaped design, protrudes on the side of the sealing plug (29) opposite the connecting strip (28).

25. An electrical plug connector, in particular a built-in plug connector, comprising a housing (101) with an insertion opening (102) for a complementary plug connector, wherein a projecting connecting flange (103) protrudes on the insertion-side end of the housing (101), which connecting flange (103) has through holes (104) for feeding through fastening means (105), an insertion-side flange plate (110) with an insertion opening (111) for the complementary plug connector and having mounting bores (112) for connecting to a device wall (G), a control panel, or the like, and a seal (117) with a central cutout (130) in the region of the insertion opening (102), inserted between the connecting flange (103) and the flange plate (110), and at least one fastening means (105) for fastening the housing (101), flange plate (110), and seal (117) to the device wall (G), control panel, or the like, wherein the outer edge (114) of the flange plate (110) is bent up towards the housing (101) and overlaps the outer edge of the connecting flange (103), and the seal (117) protrudes radially into the insertion opening (102) with a circumferential sealing lip (118) and has an edge (119) bent up towards the housing (101), which edge (119) overlaps the outer circumferential edge of the connecting flange (103) and which, itself, is overlapped by the outer edge (114) of the flange plate (110), wherein, in the assembled state, the circumferential edge (114) of the flange plate (110) extends at maximum to the height of the rear side of the connecting flange (103) of the housing (101), and the edge (19) of the seal (117) protruding towards the housing (101) is higher than the rear surface of the connecting flange (3) over the entire circumference of said connecting flange (3).

26. The plug connector according to claim 25, wherein the inner side of the outer edge (114), which is bent up towards the housing (101), of the flange plate (110) is slanted outwardly, and the outer side of the circumferential edge (119) of the seal (117) is also slanted outwardly, preferably in a complementary manner thereto.

27. The plug connector according to claim 25, wherein in the assembled state, the circumferential edge (114) of the flange plate (110) ends before the height of the rear side of the connecting flange (103) of the housing (101), and a circumferential sealing edge (131) projecting outwards covers at least a part of the thickness of the edge (114), which is bent up towards the housing (101), of the flange plate (110).

28. The plug connector according to claim 25, wherein at the locations of the mounting bores (112), sealing grommets (121) are integrally formed onto the seal (117), which protrude upwards towards the flange plate (110), wherein, in the assembled state, the sealing grommets (121) extend inside the mounting bores (112) of the flange plate (110), wherein their outer diameter preferably corresponds to the inner diameter of the mounting bore (112), and wherein the sealing grommets (121) end above the lower edge of the accommodating region for the head of the fastening means (105) in the mounting bore (112).

29. The plug connector according to claim 28, wherein the inner diameter of the sealing grommets (121) corresponds at a minimum to the outer diameter of the fastening means (105).

30. The plug connector according to claim 25, wherein the flange plate (110) has retaining pins (116) protruding towards the housing (101), that the connecting flange (103) has corresponding retaining bores (106), into which the ends of the retaining pins (116) can be inserted, wherein the retaining bores (106) extend in the center of rings (107) rising above the connecting flange (103), and the seal (117) overlaps these rings (107) with the centrally open domes (122) abutting thereon.

31. The plug connector according to claim 30, wherein the central opening (123) of the domes (122) has a slightly smaller diameter than the retaining bore (106) and/or the outer diameter of the retaining pins (116).

32. The plug connector according to claim 25, wherein the flange plate (110) has a circumferential groove (125) surrounding the insertion opening (111), in which groove (125) a ridge (124) is accommodated, which surrounds the sealing lip (118) for the insertion opening (102) radially outside and rises above the surface of the seal (117).

33. The plug connector according to claim 25, wherein in the flange plate (110), a recess (113) extends radially outwards from the insertion opening (111), through which recess (113), in the assembled state, an actuating element (108) for a locking mechanism (8, 109) protrudes from the housing (101) outwards towards the front side of the flange plate (110), wherein a dome (126) rising above the surface of the seal (117), radially connecting to the insertion opening (111), extends through the recess (113) outwards towards the front side of the flange plate (110), and thereby, the actuating element (108) is covered by the dome (126).

34. A seal (117) for the plug connector according to claim 1, for sealing against a device wall (G) or the like, with a central cutout (130) at the location of the insertion opening (102) of the plug connector and recesses (120) at the locations of mounting bores (12) for the plug connector, wherein a sealing lip (118) surrounding the central cutout (130) limits the inner circumference of the central cutout, and an edge (119) bent backwards and rising above the rear surface of the seal (117) is present on a rear side of the seal (117), on which edge (19) a circumferential sealing structure is arranged or which edge (19) itself forms the sealing structure.

35. The seal according to claim 34, wherein the sealing structure comprises a circumferential sealing ridge, wherein preferably, the outside of the circumferential edge (119) of the seal (117) is slanted outwardly.

36. The seal according to claim 34, wherein the sealing structure is a circumferential sealing edge radially projecting outwards.

37. The seal according to claim 34, wherein sealing grommets (121) rising above the front surface of the seal (117) and having central feed-throughs (120) for the fastening means (105) are arranged at locations for feeding through fastening means (105).

38. The seal according to claim 34, wherein domes (122) rising above the front surface of the seal (117) and having central feed-throughs (123) for spacer pins (116) are arranged at locations for feeding through spacer pins (116).

39. The seal according to claim 34, wherein a dome (126) rising above the front surface of the seal (117), radially connecting to the central cutout (130), is arranged and preferably formed integrally with the seal (117).

40. The seal according to claim 34, wherein a ridge (124) surrounding the central cutout (130) radially outside, rising above the front surface of the seal (117), is provided.

41. The seal according to claim 34, wherein at least one radially protruding connecting strip (127) is integrally formed onto the seal (117), to the outer end of which connecting strip (27) a preferably pot-shaped sealing plug (128) is fastened, the outer diameter of which is slightly greater than the inner diameter of the sealing lip (118) of the central cutout (130).

42. The seal according to claim 41, wherein a full-surface gripping lug (129), which preferably has a pot-shaped design, protrudes on the side of the sealing plug (128) opposite the connecting strip (127).

* * * * *